(12) United States Patent
Ikeda et al.

(10) Patent No.: US 9,222,217 B2
(45) Date of Patent: Dec. 29, 2015

(54) INK AND DYED ARTICLE

(71) Applicant: Seiko Epson Corporation, Tokyo (JP)

(72) Inventors: Yasunari Ikeda, Shiojiri (JP); Akihito Sao, Matsumoto (JP); Hiroshi Takahashi, Shiojiri (JP); Shinichi Naito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/075,069

(22) Filed: Nov. 8, 2013

(65) Prior Publication Data

US 2014/0123406 A1    May 8, 2014

(30) Foreign Application Priority Data

Nov. 8, 2012    (JP) ................. 2012-246041

(51) Int. Cl.

| | |
|---|---|
| *C09D 11/02* | (2014.01) |
| *D06P 5/28* | (2006.01) |
| *B41J 2/175* | (2006.01) |
| *C09D 11/326* | (2014.01) |
| *C09D 11/328* | (2014.01) |
| *C09D 11/38* | (2014.01) |
| *D06P 1/16* | (2006.01) |
| *D06P 1/52* | (2006.01) |
| *D06P 1/613* | (2006.01) |
| *D06P 1/62* | (2006.01) |
| *D06P 1/651* | (2006.01) |

(52) U.S. Cl.
CPC ............... *D06P 5/004* (2013.01); *B41J 2/1752* (2013.01); *B41J 2/17513* (2013.01); *B41J 2/17553* (2013.01); *C09D 11/326* (2013.01); *C09D 11/328* (2013.01); *C09D 11/38* (2013.01); *D06P 1/16* (2013.01); *D06P 1/5221* (2013.01); *D06P 1/5257* (2013.01); *D06P 1/6133* (2013.01); *D06P 1/623* (2013.01); *D06P 1/65118* (2013.01); *D06P 1/65131* (2013.01)

(58) Field of Classification Search
CPC ....................................................... C09D 11/30
USPC ........................................... 106/31.59, 31.58
See application file for complete search history.

(56) References Cited

U.S. PATENT DOCUMENTS

| | | | | |
|---|---|---|---|---|
| 5,395,434 | A | * | 3/1995 | Tochihara et al. ......... 106/31.43 |
| 5,658,376 | A | * | 8/1997 | Noguchi et al. ........... 106/31.43 |
| 6,086,197 | A | * | 7/2000 | Kubota et al. ................. 347/96 |
| 2003/0101905 | A1 | * | 6/2003 | Momose .................... 106/31.58 |
| 2004/0196343 | A1 | * | 10/2004 | Maekawa et al. ............. 347/100 |
| 2011/0048278 | A1 | * | 3/2011 | Kiyomoto et al. ......... 106/31.86 |

FOREIGN PATENT DOCUMENTS

| | | |
|---|---|---|
| JP | H06-184480 A | 7/1994 |
| JP | 2000-297234 A | 10/2000 |

* cited by examiner

*Primary Examiner* — Veronica F Faison
(74) *Attorney, Agent, or Firm* — Nutter McClennen & Fish LLP; John J. Penny, Jr.; Taylor M. Coon

(57) ABSTRACT

An ink contains (A) water, (B) a disperse dye, (C) a resin dispersant, and (D) at least one selected from the group consisting of a compound represented by formula (1) and a compound represented by formula (2) and having an HLB of 15 or more:

$$RO(CH_2CH_2O)_m SO_3^- M^+ \qquad (1)$$

$$RO(CH_2CH_2O)_m H \qquad (2)$$

where R is an alkyl or alkenyl group containing 8 to 20 carbon atoms, m is an integer of 2 to 50, and $M^+$ is an alkali metal or ammonium ion. The ratio of the mass of the ingredient (D) to that of the ingredient (C) is in the range of 4% to 50%, both inclusive.

7 Claims, 11 Drawing Sheets

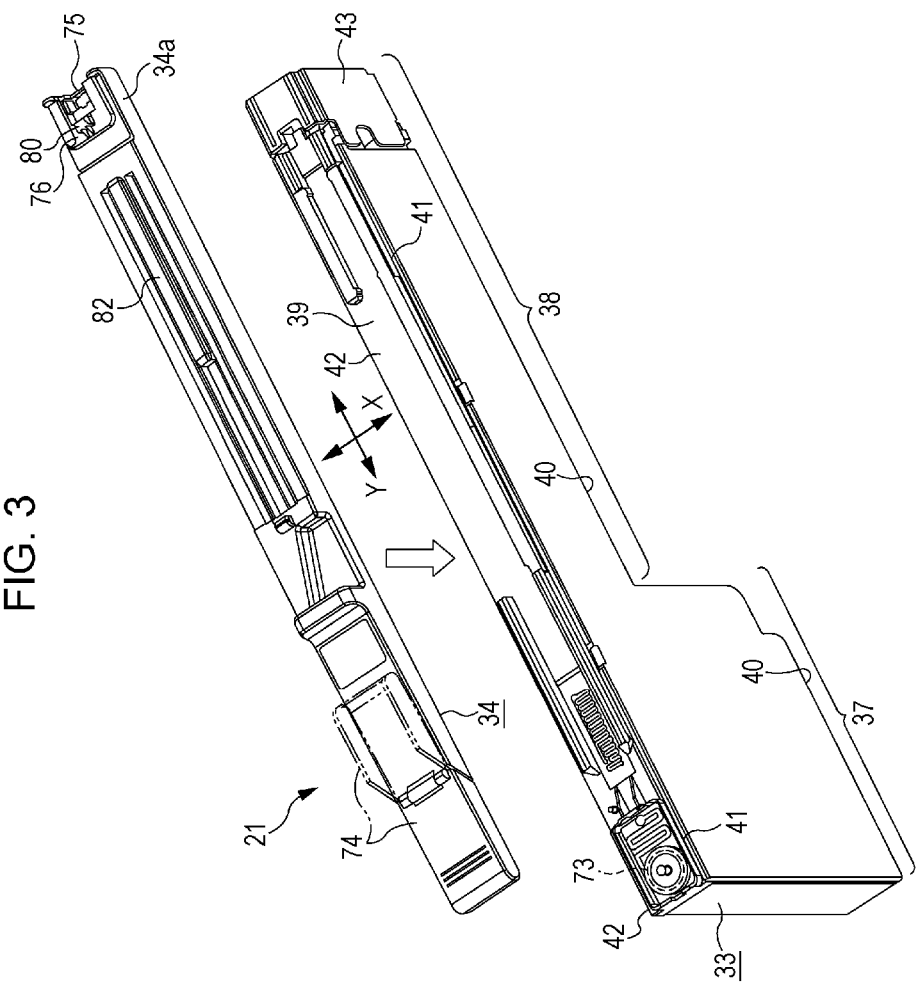

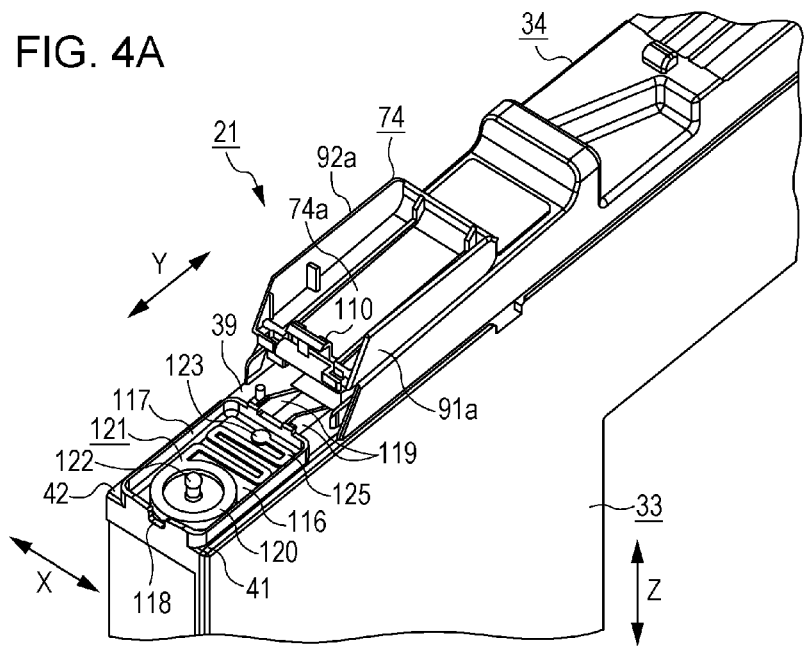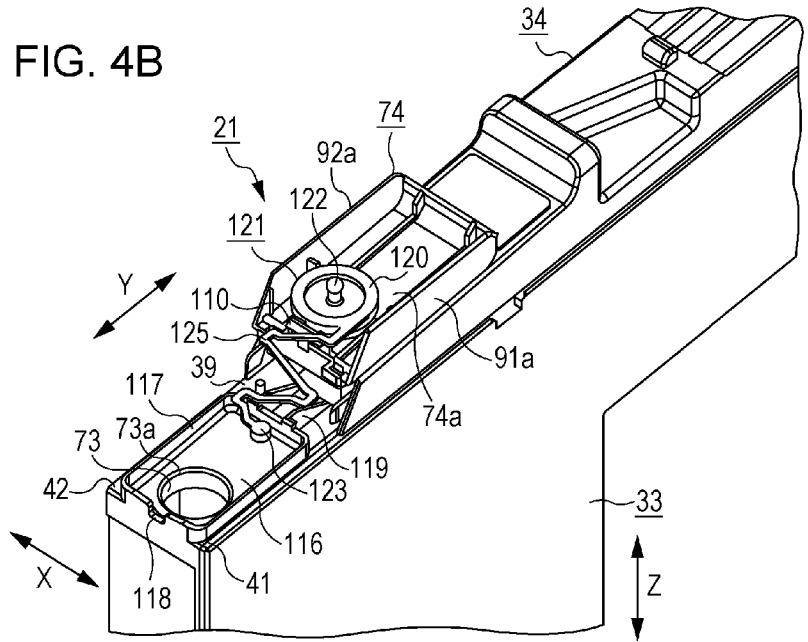

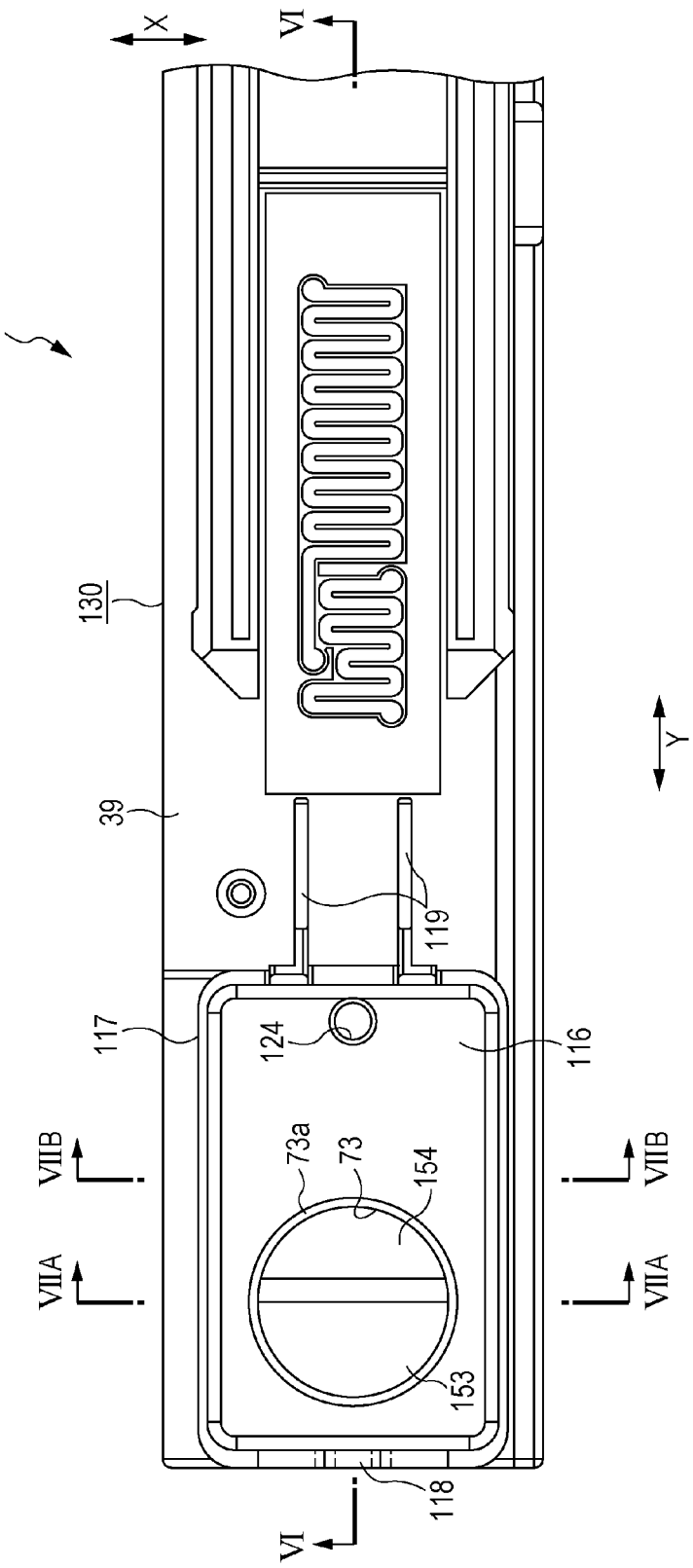

INK AND DYED ARTICLE

BACKGROUND

1. Technical Field

The present invention relates to ink and a dyed article.

2. Related Art

Sublimation transfer is a technique widely used to dye fabrics or other materials, and there are various dyeing methods based on sublimation transfer. In one of these, an ink containing a sublimation dye (a sublimation transfer ink) is applied to a sheet-shaped recording medium (e.g., a sheet of paper) by an ink jet process, and the obtained intermediate transfer medium is placed on a substrate (e.g., a piece of fabric) and heated, transferring the image by sublimation.

Disperse dyes are a preferred class of sublimation dyes for sublimation transfer inks, for some reasons including the resulting vibrant hue and the properties they impart to dyed articles, such as color uniformity between articles, fastness, and good reservation of white areas (e.g., see JP-A-6-184480). However, known inks containing disperse dyes are often disadvantageous in that insoluble aggregates of a material containing the disperse dye may form in the ink.

SUMMARY

An advantage of some aspects of the invention is that they provide an ink that imparts excellent color saturation to articles dyed therewith, has excellent storage stability, and can be used for long periods of time while the formation of insoluble material therein is effectively reduced, and a dyed article that is produced using such an ink and exhibits excellent color saturation.

The following describes some aspects of the invention. An ink according to an aspect of the invention contains (A) water, (B) a disperse dye, (C) a resin dispersant, and (D) at least one selected from the group consisting of a compound represented by formula (1) and a compound represented by formula (2) and having a hydrophilic-lipophilic balance (HLB) of 15 or more:

$$RO(CH_2CH_2O)_mSO_3^-M^+ \quad (1)$$

$$RO(CH_2CH_2O)_mH \quad (2)$$

where R is an alkyl or alkenyl group containing 8 to 20 carbon atoms, m is an integer of 2 to 50, and $M^+$ is an alkali metal or ammonium ion. The ratio of the mass of the ingredient (D) to that of the ingredient (C) is in the range of 4% to 50%, both inclusive. This aspect of the invention provide an ink that imparts excellent color saturation to articles dyed therewith, has excellent storage stability, and can be used for long periods of time while the formation of insoluble material therein is effectively prevented.

Preferably, the ratio of the mass of the ingredient (D) to that of the ingredient (C) is in the range of 10% to 30%, both inclusive. This makes the ink less likely to form insoluble material and able to keep a more appropriate viscosity, thereby allowing the ink to maintain even better suitability for discharge. It is also preferred that the ingredient (D) constitutes 0.1% by mass to 1.0% by mass, both inclusive, of the ink. This also makes the ink less likely to form insoluble material and able to keep a more appropriate viscosity and, as a result, allows the ink to maintain even better suitability for discharge.

It is also preferred that the ratio of the mass of the ingredient (C) to that of the ingredient (B) is in the range of 30% to 70%, both inclusive. This makes the ink particularly stable under high-temperature storage conditions. It is also preferred that the ingredient (C) includes a styrene-acrylic copolymer. This also makes the ink particularly stable under high-temperature storage conditions. Furthermore, it is preferred that the ingredient (B) constitutes 1.0% by mass to 10% by mass, both inclusive, of the ink. This further enhances the color yield of the dyed articles produced by sublimation transfer using the ink.

In another preferred embodiment of the ink according to this aspect of the invention, the chemical group R is an oleyl or lauryl group. This makes the ingredient (D) highly soluble in the ink, allows the ink to be discharged in a particularly stable manner, and further enhances the dispersion stability (in particular, long-term dispersion stability) of the disperse dye in the ink. It is also preferred that the ion $M^+$ in formula (1) is an ammonium ion derived from ammonia, methylamine, ethylamine, monoethanolamine, diethanolamine, or triethanolamine. This allows the ink to be discharged by an ink jet process in a particularly stable manner.

Furthermore, it is preferred that the ink according to this aspect of the invention is used with a droplet discharge apparatus having a refillable ink cartridge. Droplet discharge apparatuses equipped with a refillable ink cartridge often suffer from the formation of insoluble material in the ink and related issues (e.g., a reduced stability of droplets discharged by an ink jet process) because the water as an ingredient of the ink evaporates and, as a result, the solid content of the ink is likely to increase. The use of the ink according to this aspect of the invention with a droplet discharge apparatus having a refillable ink cartridge effectively prevents such problems. This means that the advantages of this aspect of the invention become more significant when the ink is used with a droplet discharge apparatus having a refillable ink cartridge. A dyed article according to another aspect of the invention is produced using an ink according to one aspect of the invention. This dyed article exhibits excellent color saturation.

BRIEF DESCRIPTION OF THE DRAWINGS

The invention will be described with reference to the accompanying drawings, wherein like numbers reference like elements.

FIG. 3 is a perspective view of one of the ink cartridges with the slider removed.

FIGS. 4A and 4B are perspective views of the ink cartridge with the cover in the open position. In FIG. 4A, the injection port is closed with the cap, and in FIG. 4B, the cap has been removed from the injection port.

FIG. 5 is a plan view of an ink tank.

DESCRIPTION OF EXEMPLARY EMBODIMENTS

Figure 1:
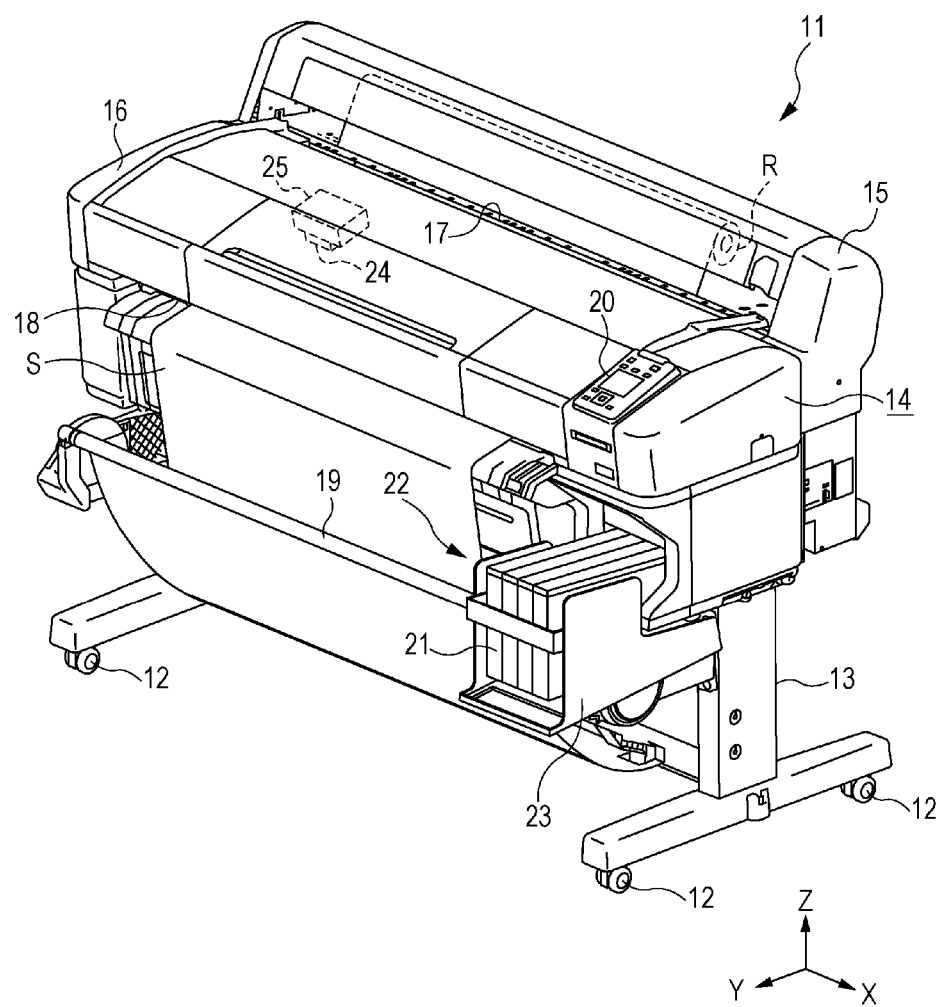
FIG. 1 is a perspective view of an example of a droplet discharge apparatus having ink cartridges (a printer).

The following describes some preferred embodiments of the invention in detail.

Ink

The following paragraphs outline an ink according to an embodiment of the invention. Incidentally, sublimation transfer is a technique widely used to dye fabrics or other materials, and there are various dyeing methods based on sublimation transfer. In one of these, an ink containing a sublimation dye (a sublimation transfer ink) is applied to a sheet-shaped recording medium (e.g., a sheet of paper) by an ink jet process, and the obtained intermediate transfer medium is placed on a substrate (e.g., a piece of fabric) and heated, transferring the image by sublimation.

Disperse dyes are a preferred class of sublimation dyes for sublimation transfer inks, for some reasons including the resulting vibrant hue and the properties they impart to dyed articles (e.g., color uniformity between articles, fastness, and good reservation of white areas). However, known inks containing disperse dyes are often disadvantageous in that insoluble aggregates of a material containing the disperse dye may form in the ink.

After extensive research for the prevention of such problems, the inventors reached the invention, an embodiment of which is detailed below. The ink according to this embodiment of the invention contains (A) water, (B) a disperse dye, (C) a resin dispersant, and (D) at least one selected from the group consisting of a compound represented by formula (1) and a compound represented by formula (2) and having a hydrophilic-lipophilic balance (HLB) of 15 or more:

$$RO(CH_2CH_2O)_m SO_3^- M^+ \quad (1)$$

$$RO(CH_2CH_2O)_m H \quad (2)$$

where R is an alkyl or alkenyl group containing 8 to 20 carbon atoms, m is an integer of 2 to 50, and $M^+$ is an alkali metal or ammonium ion. The ratio of the mass of the ingredient (D) to that of the ingredient (C) is in the range of 4% to 50%, both inclusive. Configuring an ink in this way reliably prevents problems of the aforementioned type. In other words, this embodiment of the invention provides an ink that imparts excellent color saturation to articles dyed therewith, has excellent storage stability, and can be used for long periods of time while the formation of insoluble material therein is effectively prevented.

The following is the details of each ingredient of the ink according to this embodiment of the invention.

Ingredient (A)

The ink according to this embodiment of the invention contains water as ingredient (A), which serves as a medium that allows the disperse dye, detailed later herein, to disperse therein. Adding an appropriate amount of water to ink (a sublimation transfer ink) adjusts the viscosity and the surface tension of the ink and ensures that these variables fall within their respective preferred ranges, making the ink highly suitable for discharge by an ink jet process. Water is also important for improved productivity of dyed articles because this component can be easily removed after the ink is discharged by an ink jet process. Furthermore, water is essential for ensuring the safety of those who are engaged in the production of dyed articles because it is an extremely safe substance for the human body and many things. The amount of water in the ink is not limited. Preferably, water constitutes 60% by mass to 90% by mass, both inclusive, more preferably 70% by mass to 85% by mass, both inclusive, of the ink.

Ingredient (B)

The ink according to this embodiment of the invention contains a disperse dye as ingredient (B). Disperse dyes are a class of dyes that disperse in ink through a dispersion medium and sublime when heated (sublimation dyes). Disperse dyes are more suitable than other coloring agents for some reasons including the resulting vibrant hue and the properties they impart to dyed articles (e.g., color uniformity between articles, fastness, and good reservation of white areas).

As described above, known inks containing disperse dyes are often disadvantageous in that insoluble aggregates of a material containing the disperse dye may form in the ink. This embodiment of the invention reliably prevents problems of this type. More specifically, this embodiment of the invention prevents problems of this type while maintaining the advantages of the disperse dye.

Specific examples of disperse dyes that can be used include the following: C.I. Disperse Yellow 3, 7, 8, 23, 39, 51, 54, 60, 71, and 86; C.I. Disperse Orange 1, 1:1, 5, 20, 25, 25:1, 33, 56, and 76; C.I. Disperse Brown 2; C.I. Disperse Red 11, 50, 53, 55, 55:1, 59, 60, 65, 70, 75, 93, 146, 158, 190, 190:1, 207, 239, and 240; C.I. Vat Red 41; C.I. Disperse Violet 8, 17, 23, 27, 28, 29, 36, and 57; C.I. Disperse Blue 19, 26, 26:1, 35, 55, 56, 58, 64, 64:1, 72, 72:1, 81, 81:1, 91, 95, 108, 131, 141, 145, and 359; and C.I. Solvent Blue 36, 63, 105, and 111. One or a combination of two or more disperse dyes can be used.

From the viewpoint of the storage stability of the ink, the following dyes are preferred: C.I. Disperse Yellow 3, 7, 8, 23, 51, 54, 60, 71, and 86; C.I. Disperse Orange 20, 25, 25:1, 56, and 76; C.I. Disperse Brown 2; C.I. Disperse Red 11, 53, 55, 55:1, 59, 60, 65, 70, 75, 146, 190, 190:1, 207, 239, and 240; C.I. Vat Red 41; C.I. Disperse Violet 8, 17, 23, 27, 28, 29, 36, and 57; C.I. Disperse Blue 26, 26:1, 55, 56, 58, 64, 64:1, 72, 72:1, 81, 81:1, 91, 95, 108, 131, 141, 145, and 359; and C.I. Solvent Blue 36, 63, 105, and 111.

The amount of the disperse dye in the ink is not limited. Preferably, the disperse dye constitutes 1.0% by mass to 10% by mass, both inclusive, more preferably 2.0% by mass to 8.0% by mass, both inclusive, of the ink. This ensures both a color yield of dyed articles higher than the sufficient range and enhanced properties of the ink for ink jet applications, e.g., suitability for discharge and recovery after being left unused. When the ink contains two or more disperse dyes, it is preferred that the total disperse dye content is in the above range.

Ingredient (C)

The ink according to this embodiment of the invention contains a resin dispersant as ingredient (C). The resin dispersant allows the disperse dye to disperse in the ink in a highly stable manner, imparts excellent storage stability to the ink, and ensures that droplets of the ink can be discharged by an ink jet process with excellent stability. In this embodiment of the invention, the resin dispersant is used in combination with an appropriate amount of the ingredient (D), detailed later herein, and, as a result, the dispersion stability of the disperse dye in the ink, the storage stability of the ink, and the stability of droplets of the ink discharged by an ink jet process are quite excellent.

The resin dispersant can be known one, for example. Specific examples of preferred resin dispersants include anionic ones, such as styrene-acrylic copolymers, polyacrylates, and polycarbonates. One or a combination of two or more resin dispersants can be used. Preferably, the ink contains a styrene-acrylic copolymer as resin dispersant. This makes the ink particularly stable under high-temperature storage conditions.

The amount of the resin dispersant in the ink is not limited. Preferably, the resin dispersant constitutes 0.3% by mass to 7.0% by mass, both inclusive, more preferably 1.0% by mass to 5.0% by mass, both inclusive, of the ink. This further enhances the storage stability of the ink and makes the ink able to keep an appropriate viscosity, allowing the ink to maintain even better suitability for discharge. When the ink contains two or more resin dispersants, it is preferred that the total resin dispersant content is in the above range.

Preferably, the ratio of the mass of the resin dispersant (ingredient (C)) to that of the disperse dye (ingredient (B)), i.e., $(X_C/X_B) \times 100$ where $X_B$ is the content of the disperse dye (ingredient (B); % by mass) in the ink and $X_C$ is the content of the resin dispersant (ingredient (C); % by mass) in the ink, is in the range of 30% to 70%, both inclusive, more preferably 35% to 65%, both inclusive. When such a relation holds, the ink is particularly stable under high-temperature storage conditions and can also keep a more appropriate viscosity and, thus, maintain better suitability for discharge.

Ingredient (D)

The ink according to this embodiment of the invention contains a compound represented by formula (1) and/or a compound represented by formula (2) and having a hydrophilic-lipophilic balance (HLB) of 15 or more as ingredient (D):

$$RO(CH_2CH_2O)_mSO_3^-M^+ \quad (1)$$

$$RO(CH_2CH_2O)_mH \quad (2)$$

where R is an alkyl or alkenyl group containing 8 to 20 carbon atoms, m is an integer of 2 to 50, and $M^+$ is an alkali metal or ammonium ion.

In this embodiment of the invention, an appropriate amount of this ingredient (D) is used in combination with the aforementioned ingredient (C) (a resin dispersant) and, as a result, the dispersion stability of the disperse dye in the ink, the storage stability of the ink, and the stability of droplets of the ink discharged by an ink jet process are quite excellent. This embodiment of the invention requires that the ratio of the mass of the ingredient (D) to that of the resin dispersant (ingredient (C)), i.e., $(X_D/X_C) \times 100$ where $X_C$ is the content of the resin dispersant (ingredient (C); % by mass) in the ink and $X_D$ is the content of the ingredient (D) (% by mass) in the ink, be in the range of 4% to 50%, both inclusive. This ensures that the dispersion stability of the disperse dye in the ink, the storage stability of the ink, and the stability of droplets of the ink discharged by an ink jet process are quite excellent. If the ratio of the mass of the ingredient (D) to that of the resin dispersant (ingredient (C)) $((X_D/X_C) \times 100)$ is too small, the formation of insoluble material in the ink is reduced less effectively than expected. If the ratio of the mass of the ingredient (D) to that of the resin dispersant (ingredient (C)) $((X_D/X_C) \times 100)$ is too large, too high a viscosity affects the stability of the ink during discharge.

The ratio of the mass of the ingredient (D) to that of the resin dispersant (ingredient (C)) $((X_D/X_C) \times 100)$, which should be in the range of 4% to 50%, both inclusive, as described above, is preferably in the range of 10% to 30%, both inclusive. This further enhances the storage stability of the ink, thereby ensuring that the formation of insoluble material in the ink is significantly reduced during storage and in other situations. In particular, compounds represented by formula (1), when contained in the ink as ingredient (D), reduce the viscosity of the ink, thereby allowing greater flexibility in designing the ink for ink jet applications. On the other hand, compounds represented by formula (2), when contained in the ink as ingredient (D), further enhance the dispersion stability of the disperse dye in the ink, the storage stability of the ink, and the stability of droplets of the ink discharged by an ink jet process.

The ion $M^+$ in formula (1) is an alkali metal or ammonium ion (a primary, secondary, tertiary, or quaternary ammonium ion or an ammonium ion derived from an alkanolamine). Preferably, $M^+$ is an ammonium ion (in particular, an ammonium ion derived from ammonia, methylamine, ethylamine, monoethanolamine, diethanolamine, or triethanolamine). This allows the ink to be discharged by an ink jet process in a particularly stable manner. The compound represented by formula (2) has a hydrophilic-lipophilic balance (HLB) of 15 or more. This ensures sufficient stability of the ink and reduces the formation of insoluble material in the ink. The HLB, as used herein, is calculated by Griffin's method and is defined as follows: HLB=20×total formula weight of the hydrophilic portion of the molecule/molecular weight of the whole molecule.

The group R in formulae (1) and (2) is an alkyl or alkenyl group containing 8 to 20 carbon atoms. Preferably, R is an oleyl or lauryl group. This makes the ingredient (D) highly soluble in the ink, allows the ink to be discharged in a particularly stable manner, and further enhances the dispersion stability (in particular, long-term dispersion stability) of the disperse dye in the ink. The number m in formulae (1) and (2) is an integer of 2 to 5. Preferably, m is an integer of 20 to 30. This optimizes the viscosity of the ink, thereby further enhancing the stability of droplets of the ink discharged by an ink jet process, and also further increases the dispersion stability (in particular, long-term dispersion stability) of the disperse dye in the ink.

Preferably, the ingredient (D) constitutes 0.1% by mass to 1.0% by mass, both inclusive, of the ink. This makes the ink less likely to form insoluble material and able to keep a more appropriate viscosity, thereby allowing the ink to maintain even better suitability for discharge. When the ink contains two or more compounds as ingredient (D), it is preferred that the total content of these compounds is in the above range.

Additives

The ink according to this embodiment of the invention may contain ingredients other than those described above (the ingredients (A), (B), (C), and (D)). Examples of suitable additives include nonaqueous solvents (dispersants), trehaloses, preservatives/antimolds, pH-adjusting agents, chelating agents, antirusts, ultraviolet absorbents, antifoams, surface tension modifiers, polysiloxanes, and polyols other than trehaloses.

Trehaloses are a class of disaccharides consisting of two glucose molecules bonded through their reducing groups and include α,α-trehalose (O-α-D-glucopyranosyl-α-D-glucopyranoside; hereinafter simply referred to as trehalose), α,β-trehalose (neotrehalose), and β,β-trehalose (isotrehalose). Trehaloses make the ink less likely to produce misty vapor (smoke) on heating (e.g., during transfer) and thus can be used to greatly improve the working environment where dyed articles are produced using the ink.

Examples of preservatives/antimolds that can be used include the compounds of the following types: organosulfur, organonitrogen-sulfur, organohalogen, haloallylsulfone, iodopropargyl, N-haloalkylthio, benzothiazole, nitrile, pyridine, 8-oxyquinoline, isothiazolin, dithiol, pyridine oxide, nitropropane, organotin, phenol, quaternary ammonium salt, triazine, thiadiazine, anilide, adamantane, dithiocarbamate, bromoindanone, benzyl bromoacetate, and inorganic salt.

Specific examples include sodium pentachlorophenol as an organohalogen compound, sodium pyridinethione-1-oxide and zinc pyridinethione-1-oxide as pyridine oxides, and amine salts of 1-benzisothiazolin-3-one, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride as isothiazolins. Some other examples of preservative/antimolds that can be used are sodium dehydroacetate, sodium sorbate, and sodium benzoate.

Adding a pH-adjusting agent to the ink greatly improves the characteristics of the ink such as storage stability. The reliability of dyed articles produced using the ink is also greatly improved. Examples of suitable pH-adjusting agents include ones with which the pH of the ink can be adjusted to be within the range of 6.0 to 11.0, both inclusive. Specific examples of such pH-adjusting agents include the following: alkanolamines such as diethanolamine, triethanolamine, dimethylethanolamine, and diethylethanolamine; alkali metal hydroxides such as lithium hydroxide, sodium hydroxide, and potassium hydroxide; ammonium hydroxide; alkali metal carbonates such as lithium carbonate, sodium carbonate, and potassium carbonate; and aminosulfonic acids such as taurine.

Examples of chelating agents that can be used include disodium ethylenediaminetetraacetate, sodium nitrilotriacetate, sodium hydroxyethyl ethylenediaminetriacetate, sodium diethylenetriaminepentaacetate, and sodium uracil diacetate. Examples of antirusts that can be used include bisulfites, sodium thiosulfate, ammonium thioglycolate, diisopropylammonium nitrite, pentaerythritol tetranitrate, and dicyclohexylammonium nitrite.

Examples of ultraviolet absorbents that can be used include the compounds of the following types: benzophenone, benzotriazole, cinnamic acid, triazine, and stilbene. The "fluorescent brighteners" (compounds that absorb ultraviolet light and emit fluorescent light, represented by benzoxazoles) can also be used. Examples of antifoams that can be used include the compounds of the following types: highly oxidized oil, glycerol fatty acid esters, fluoride, silicone, and acetylene. Examples of surface tension modifiers that can be used include surfactants, such as anionic surfactants, amphoteric surfactants, cationic surfactants, and nonionic surfactants.

For anionic surfactants, examples include alkyl sulfocarboxylates, α-olefin sulfonates, polyoxyethylene alkyl ether acetates, N-acyl amino acid and its salts, N-acyl methyl taurate, alkyl sulfate polyoxyalkyl ether sulfates, alkyl sulfate polyoxyethylene alkyl ether phosphates, rosin acid soap, sulfated castor oil, lauryl alcohol sulfate, alkylphenolic phosphates, alkyl phosphates, alkyl aryl sulfonates, diethyl sulfosuccinate, diethylhexyl sulfosuccinate, and dioctyl sulfosuccinate. For amphoteric surfactants, examples include lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctyl polyaminoethyl glycine, and other imidazoline derivatives.

For cationic surfactants, examples include 2-vinylpyridine derivatives and poly(4-vinylpyridine) derivatives. For nonionic surfactants, examples include the following: ether-based surfactants such as polyoxyethylene nonyl phenyl ether, polyoxyethylene octyl phenyl ether, polyoxyethylene dodecyl phenyl ether, polyoxyethylene oleyl ether, polyoxyethylene lauryl ether, and polyoxyethylene alkyl ethers; ester-based surfactants such as polyoxyethylene oleates, polyoxyethylene distearates, sorbitan laurate, sorbitan monostearate, sorbitan monooleate, sorbitan sesquioleate, polyoxyethylene monooleates, and polyoxyethylene stearates; and acetylene glycol (alcohol)-based surfactants such as 2,4,7,9-tetramethyl-5-decyne-4,7-diol, 3,6-dimethyl-4-octyne-3,6-diol, and 3,5-dimethyl-1-hexyn-3-ol.

Adding a polysiloxane to the ink improves the response of droplets of the ink to discharge by an ink jet process. Examples of polysiloxanes that can be used include polyether-modified siloxanes and polyether-modified polydimethylsiloxane. Furthermore, the ink may contain a non-trehalose polyol. Examples of suitable non-trehalose polyols include polyols (preferably, diols) containing 2 to 6 carbon atoms with or without 1 intramolecular ether bond. Specific examples include ethylene glycol, diethylene glycol, triethylene glycol, propylene glycol, dipropylene glycol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexanediol, and 1,6-hexanediol. Polyols having a boiling point of 200° C. or more, e.g., propylene glycol, are preferred because of its ability to reduce smoke.

The surface tension (at 25° C.) of the ink is preferably in the range of 20 mN/m to 70 mN/m, both inclusive, more preferably 20 mN/m to 50 mN/m, both inclusive. The surface tension of ink can be determined by measurement using CBVP-A3 surface tensiometer (Kyowa Interface Science Co., Ltd.) in accordance with JIS K3362, for example. The viscosity (at 25° C.) of the ink is preferably in the range of 2 mPa·s to 20 mPa·s, both inclusive. This greatly improves the characteristics of the ink such as discharge stability (e.g., the precision of the amount of ink discharged, the dynamics of flying droplets) and response to discharge (e.g., response speed, response to high frequencies [frequency response]). The viscosity of ink can be determined by measurement using a vibrational viscometer in accordance with JIS Z8809.

In another preferred embodiment of the invention, the ink is used with a droplet discharge apparatus having a refillable ink cartridge (an ink storing section). Droplet discharge apparatuses equipped with a refillable ink cartridge often suffer from the formation of insoluble material in the ink and related issues (e.g., a reduced stability of droplets discharged by an ink jet process) because the water as an ingredient of the ink evaporates and, as a result, the solid content of the ink is likely to increase. The use of an ink according to an aspect of the invention with a droplet discharge apparatus having a refillable ink cartridge effectively prevents such problems. This means that the advantages of that aspect of the invention become more significant when the ink is used with a droplet discharge apparatus having a refillable ink cartridge.

Figure 2:
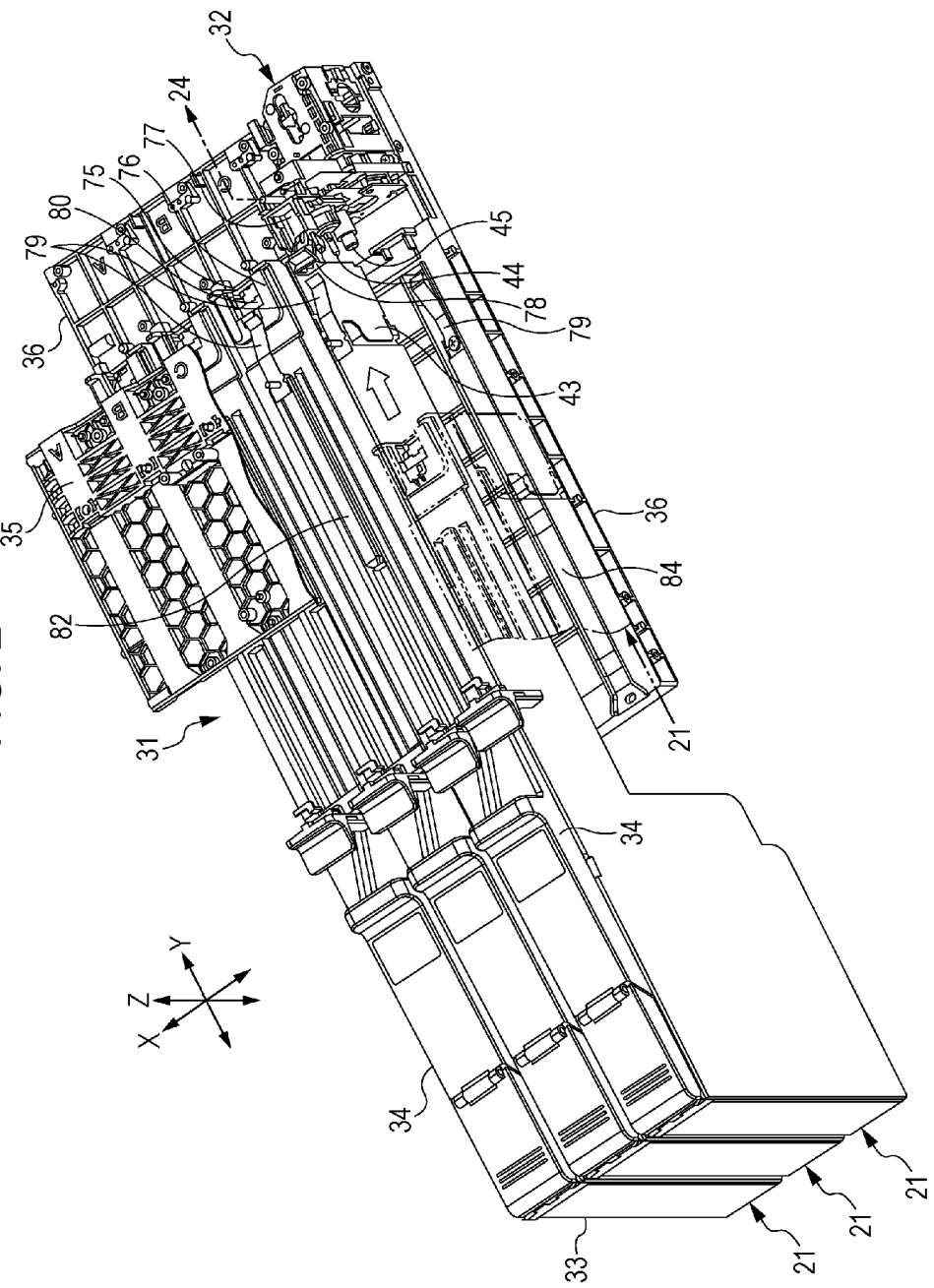
FIG. 2 is a perspective view of the printer with the ink cartridges on the cartridge holder.
Figure 6:
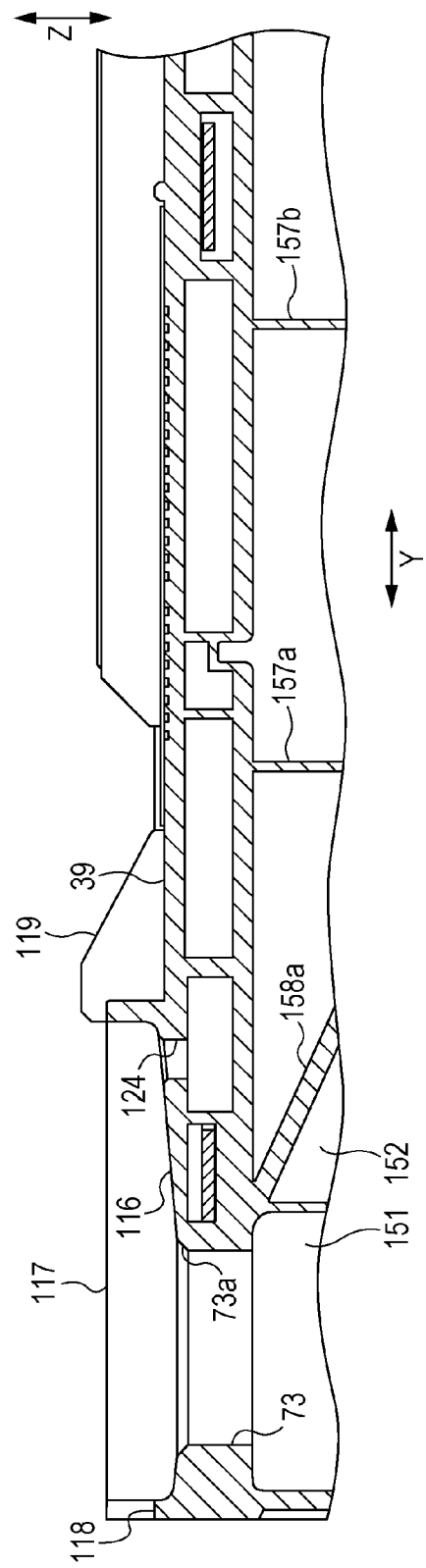
FIG. 6 is a cross-sectional view of the ink tank taken along line VI-VI in FIG. 5, viewed in the direction of the arrows.
Figure 7A:
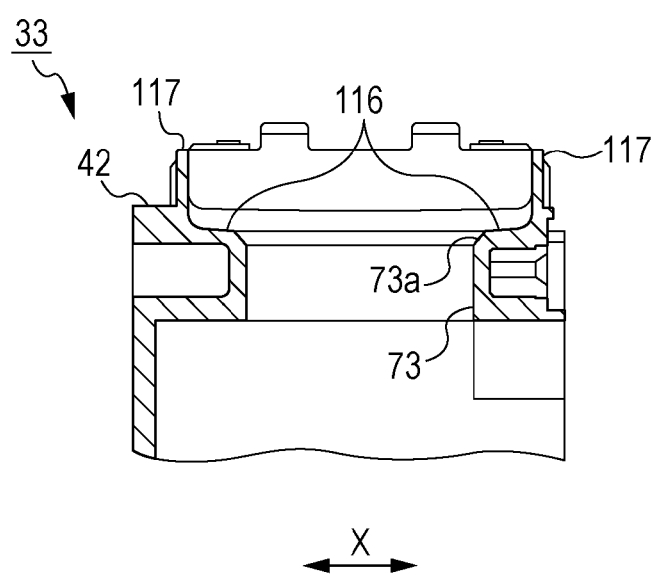
FIGS. 7A and 7B are cross-sectional views of the ink tank taken along lines VIIA-VIIA and VIIB-VIIB, respectively, in FIG. 5, viewed in the direction of the arrows.
Figure 7B:
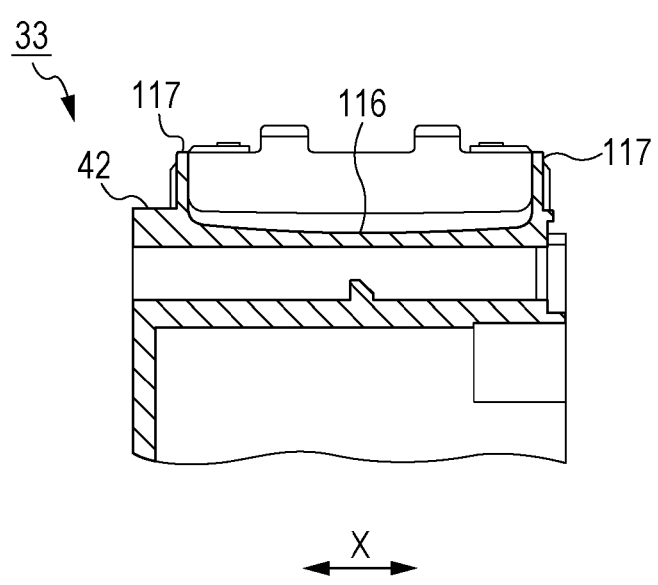
Figure 8:
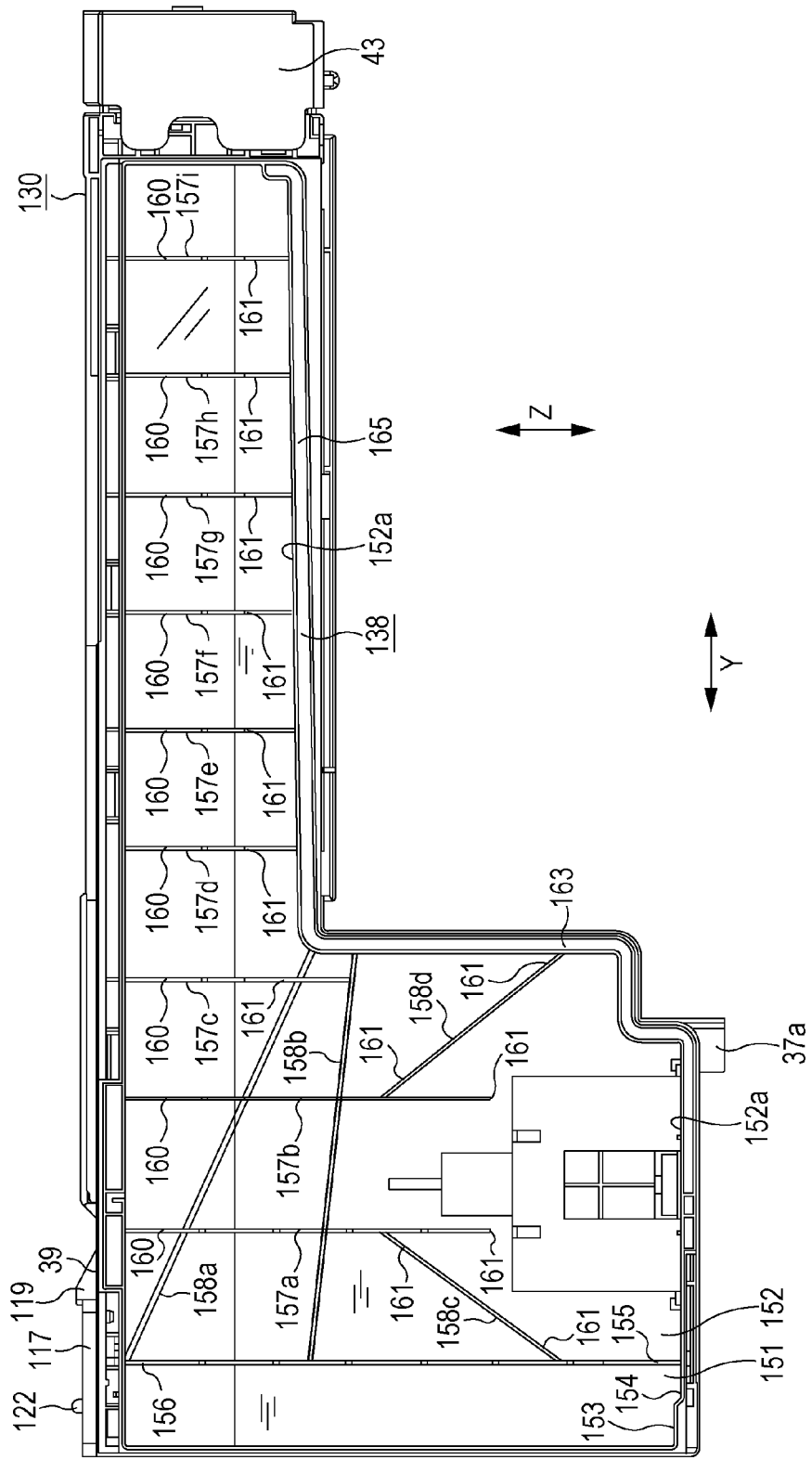
FIG. 8 is a side view of the ink tank with a piece of film attached thereto.
Figure 9:
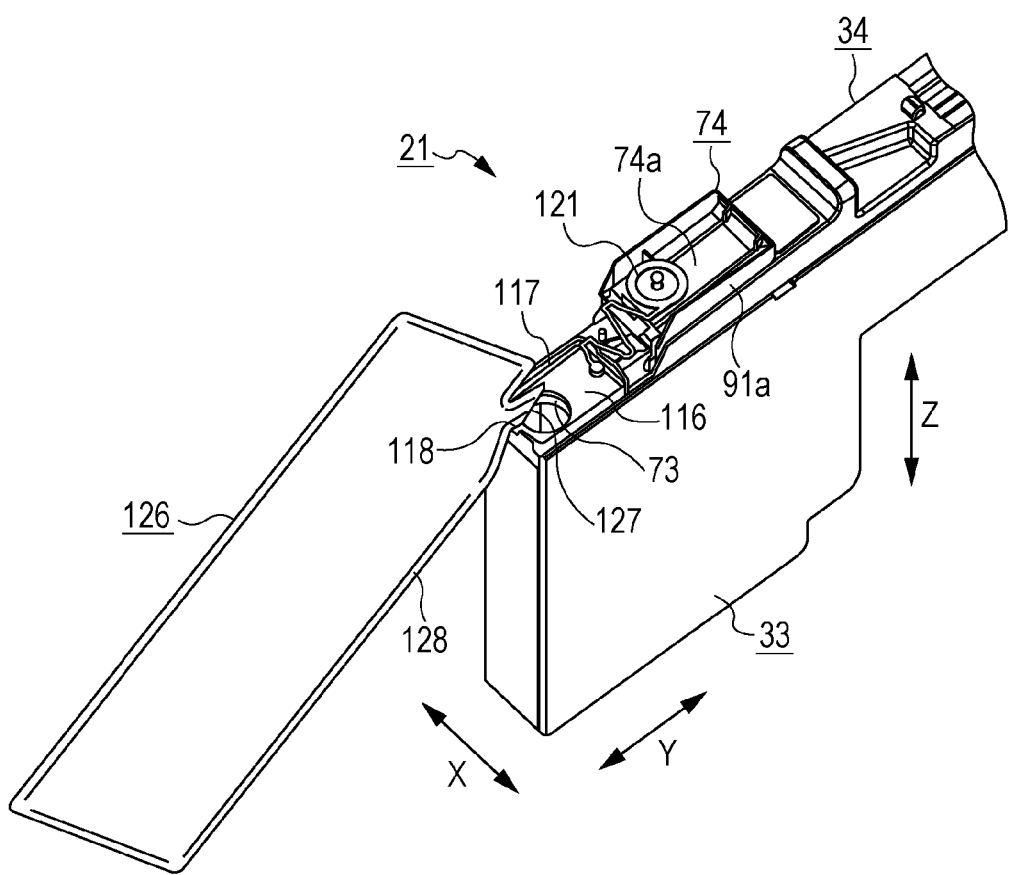
FIG. 9 is a perspective view of an ink source and an ink cartridge, illustrating the positional relation therebetween during an ink loading operation.
Figure 10:
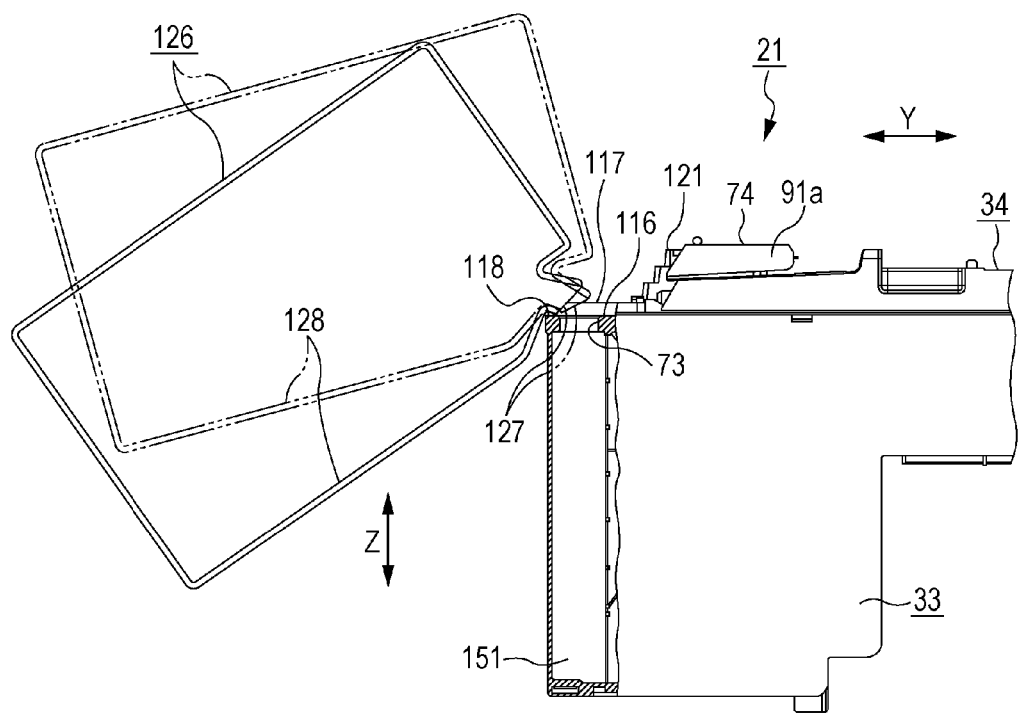
FIG. 10 is a partial cross-sectional side view of the ink source and the ink cartridge, illustrating the positional relation therebetween during an ink loading operation.
Figure 11:
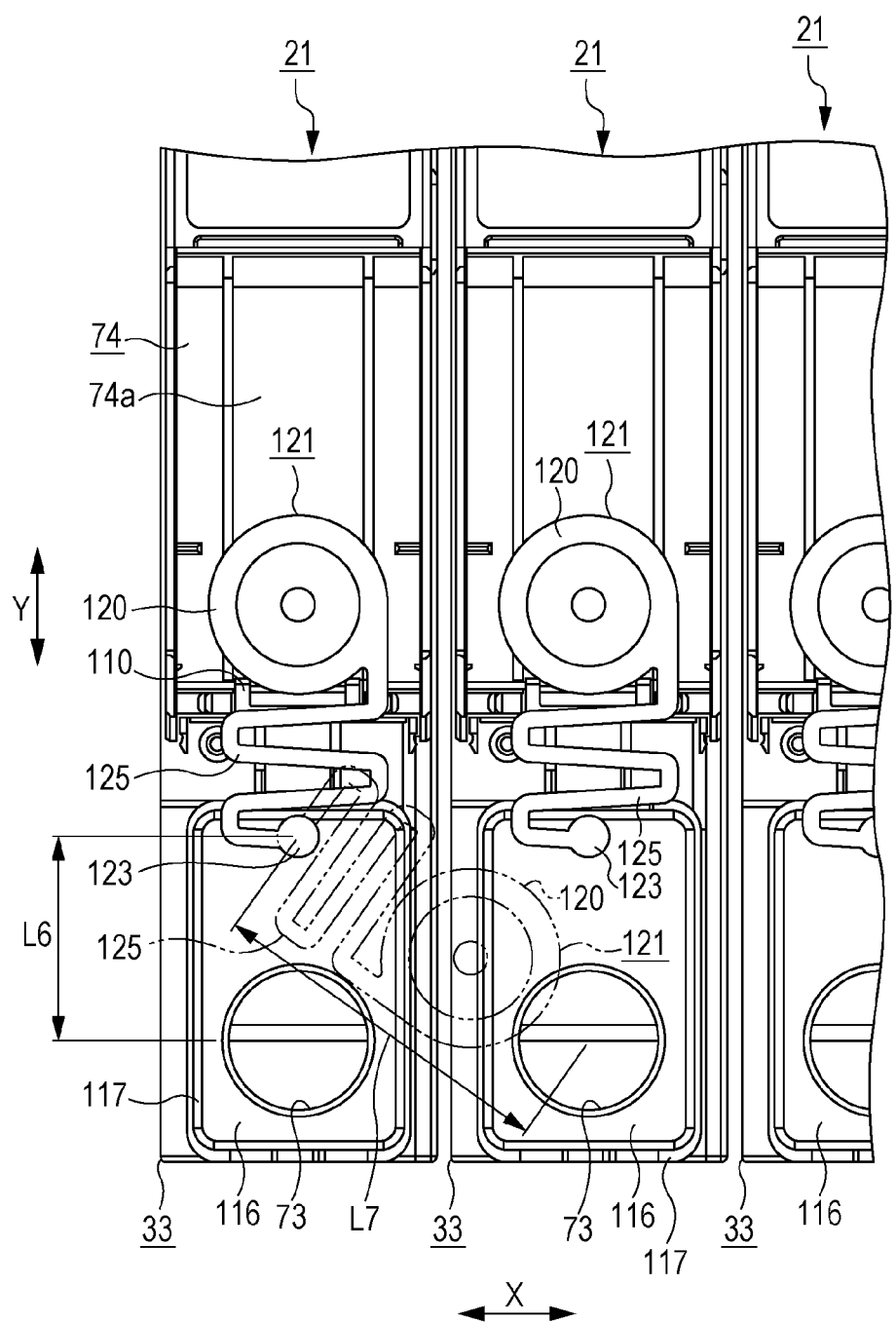
FIG. 11 is a plan view of ink cartridges, illustrating the range of motion of one capping unit around the anchoring structure thereof.

The following describes an illustrative, specific configuration of a droplet discharge apparatus with which the ink according to this embodiment of the invention can be used. FIG. 1 is a perspective view of an example of a droplet discharge apparatus having ink cartridges (a printer). FIG. 2 is a perspective view of the printer with the ink cartridges on the cartridge holder, and FIG. 3 is a perspective view of one of the ink cartridges with the slider removed. FIGS. 4A and 4B are perspective views of the ink cartridge with the cover in the open position. In FIG. 4A, the injection port is closed with the cap, and in FIG. 4B, the cap has been removed from the injection port. FIG. 5 is a plan view of an ink tank, and FIGS. 6, 7A, and 7B are cross-sectional views of the ink tank taken along lines VI-VI, VIIA-VIIA, and VIIB-VIIB, respectively, in FIG. 5, all viewed in the direction of the arrows. FIG. 8 is a side view of the ink tank jacket with a piece of film attached thereto. FIGS. 9 and 10 are a perspective view and a partial cross-sectional side view of an ink source and an ink cartridge, both illustrating the positional relation therebetween during an ink loading operation. FIG. 11 is a plan view of ink cartridges, illustrating the range of motion of one capping unit around the anchoring structure thereof.

As illustrated in FIG. 1, the printer (droplet discharge apparatus) 11 according to this embodiment has legs 13 supported by wheels 12 and a substantially rectangular parallelepiped body 14 supported by the legs 13. In this embodiment, the direction parallel to the direction of the gravity force is referred to as vertical direction Z, and the direction of the longitudinal axis of the body 14, which crosses vertical direction Z (at right angles in this embodiment), is referred to as horizontal direction X. A direction that crosses both vertical direction Z and horizontal direction X (at right angles in this embodiment) is referred to as depth direction Y.

As illustrated in FIG. 1, the body 14 has a feeder 15 sticking upward from the back thereof. The feeder 15 is loaded with a roll of paper R, i.e., a long sheet of paper S rolled up into a cylinder for use as medium (recording medium). The housing 16, i.e., the outer cover for the body 14, has an input opening 17 in front of the feeder 15 so that the sheet of paper S fed by the feeder 15 can be introduced into the housing 16.

The body 14 also has an output opening 18 in the front thereof, through which the sheet of paper S is ejected out of the housing 16. The housing 16 contains a medium transport mechanism (not illustrated) by which the sheet of paper S fed by the feeder 15 is transported from the input opening 17 side to the output opening 18 side. The body 14 also has a medium receiver 19 in the front thereof in a lower position than the output opening 18, and the medium receiver 19 receives the sheet of paper S ejected through the output opening 18.

There is also a console 20 on the top of the body 14 at one end (at the right end in FIG. 1) outside the path of transport of the sheet of paper S with respect to horizontal direction X, and the console 20 contains controls for setup and data input, for example. The body 14 also has ink cartridges 21, each of which can contain ink, held at the bottom thereof at one end (at the right end in FIG. 1) outside the path of transport of the sheet of paper S with respect to horizontal direction X.

A plurality of ink cartridges 21 (four in the illustrated configuration) corresponding to different kinds or colors of inks are used. The ink cartridges 21 are arranged in horizontal direction X, constituting an ink storing unit 22. With each ink cartridge 21 secured to the body 14, a portion of the ink storing unit 22 is exposed in front of the body 14 (outward). This exposed portion of the ink storing unit 22 is covered from both sides in horizontal direction X and from below in vertical direction Z with a frame 23 secured to the body 14 and having a substantially U-shaped cross-section.

In the housing 16, a carriage 25 holding an ink discharge head 24 can move back and forth in the main scanning direction, i.e., horizontal direction X. The housing 16 also contains an ink supply mechanism (not illustrated) by which the inks contained in the ink cartridges 21 can be supplied to the ink discharge head 24. The ink discharge head 24 ejects droplets of the inks toward the sheet of paper S transported by the medium transport mechanism, producing records (prints). As droplets of the inks are ejected in this way, and the inks in the ink cartridges 21 are consumed.

The following describes a cartridge holder 31, i.e., a component for securing the ink cartridges 21 to the body 14, and how this cartridge holder 13 is used to secure the ink cartridges 21 to the body 14. For the sake of simplicity, FIG. 2 shows only one ink outlet 32 (ink outlets 32 constitute a section of the ink supply mechanism and carry the inks from the ink cartridges 21 to the ink discharge head 24 side), and the ink cartridge 21 corresponding to this illustrated ink outlet 32 before being attached to the cartridge holder 31 is indicated by dot-dot-dash lines and a white arrow. FIG. 3 illustrates one of the ink cartridges 21, with the two main components thereof, i.e., an ink tank 33 and a slider (auxiliary support) 34, separated from each other.

As illustrated in FIG. 2, the printer 11 has a cartridge holder 31 having an upper frame 35 and a lower frame 36 arranged in the vertical direction (vertical direction Z) with a predetermined spacing therebetween. The cartridge holder 31 also has ink outlets 32, which constitute a section of the ink supply mechanism, corresponding to the individual ink cartridges 21. In FIG. 2, the upper frame 35 is illustrated with a portion broken away over a length along horizontal direction X.

Each ink cartridge 21 is secured in a fixed position to the printer 11 with one longitudinal end (the right end in FIG. 2) in this cartridge holder 31. With the ink cartridges 21 secured to the printer 11, the inks are individually carried to the ink discharge head 24 side by the ink outlets 32 arranged to be aligned with the end of the ink cartridges 21 in the cartridge holder 31. In this embodiment, therefore, the ink cartridges 21 are held in the cartridge holder 31 of the printer 11 and secured in a fixed position to the printer 11, and the ink cartridges 21 are used in this position.

As illustrated in FIGS. 2 and 3, each ink cartridge 21 has an ink tank 33 for storing the ink and a slider 34 overlapping the ink tank 33 from above in the vertical direction, or more specifically in the direction opposite to the gravity force. The ink tank 33 is a rectangular parallelepiped having substantially L-shaped sides and has a fixed width in the transverse direction thereof, where the longitudinal direction is defined as the direction crossing the longitudinal direction of the body 14 at right angles in a substantially horizontal plane (depth direction Y) and the transverse direction as the direction crossing this longitudinal direction at right angles in a substantially horizontal plane (horizontal direction X). More specifically, the ink tank 33 has a first chamber 37 and a second chamber 38 when viewed in the transverse direction (horizontal direction X). The first chamber 37 is substantially square, and the second chamber 38 is located behind the first chamber 37 and has a substantially rectangular shape with its longer sides in depth direction Y. The ink tank 33 also has flat portions 41 and 42 on the top 39, and these portions are located at both ends in the transverse direction and extend smoothly and seamlessly in the longitudinal direction (depth direction Y). The slider 34 can slide along these flat portions 41 and 42. The bottom 40 of the ink tank 33 has a stepped surface, the first chamber 37 lower than the second chamber 38.

In this embodiment, each ink cartridge 21 is secured in a fixed position to the printer 11 by screwing the anchoring structure 37a located at the bottom of the first chamber 37 (see FIG. 8) to the anchoring point (not illustrated) on the body 14 side. Once the ink tank 33 is secured in this way, almost all of the second chamber 38 is in the body 14 of the printer 11 and provides a second section, whereas the first chamber 37 is outside the body 14 of the printer 11 and provide a first section which is exposed in front of the body 14.

The second chamber 38 has a connector 43 at the rear end in the longitudinal direction, i.e., at the end opposite to the first chamber 37, and the connector 43 is a component different from the housing for the ink tank 33 (the ink tank jacket 130 in FIG. 5) and can move with respect to the second chamber 38. The connector 43 has an ink passage and a transmission mechanism. On the cartridge holder 31 side, each ink outlet 32 has a needle 44, and the ink passage guides the ink contained in the ink tank 33 to the needle 44. Each ink outlet 32 also has a volume sensing probe 45, and the transmission mechanism tells the volume sensing probe 45 the presence or absence of the ink in the ink tank 33.

The following describes the slider 34. As illustrated in FIG. 3, the first section of the ink tank 33, located outside the printer 11, has an injection port (injection portion) 73 on the top 39 of the ink tank 33, and through this injection port 73 the ink in injected into the ink tank 33. In this embodiment, the first chamber 37 corresponds to the first section, and this first chamber 37 has the injection port 73. The injection port 73, located outside the printer 11, can be covered with the slider 34 so that access is allowed only while the ink is being injected.

The slider 34 is in a substantially rectangular shape having a longitudinal direction, and its outer shape is substantially the same as that of the top 39 of the ink tank 33. The slider 34 has a cover 74 which can be opened and closed, and this cover 74 hides the injection port 73 of the ink tank 33 from above when the slider 34 is disposed to substantially overlap the top 39 of the ink tank 33 with one end thereof in the cartridge holder 31. More specifically, the slider 34 has, at one end in the longitudinal direction, a cover 74 which hides the injection port 73 in one position and exposes in another. Hereinafter, the term insertion direction refers to the direction in which the slider 34 is inserted into the cartridge holder 31, unless otherwise specified.

In this embodiment, the cover 74 is pivoted to the slider 34 at a point closer to the second chamber 38 (second section) than the injection port 73, with the injection port 73 hidden. The cover 74 can rotate around an axis extending in the transverse direction of the ink tank 33. As indicated by dot-dot-dash lines in FIG. 3, the user can access the injection port 33 by lifting the front of the cover 74, located at the front end in the longitudinal direction of the slider 34, and rotating the cover 74 by about 180° toward the second chamber 38, i.e., toward the printer 11.

This means that the cover 74 can come behind the injection port 73 by changing its state from hiding the injection port 73, indicated by solid lines in FIG. 3, to exposing the injection port 73, indicated by dot-dot-dash lines in FIG. 3. In this embodiment, the injection port 37 is near the front end of the first chamber 37 of the ink tank 33 so that the cover 74 can hide the injection port 37 with a relatively short length in depth direction Y.

The slider 34 also has a chip holder 76 at the leading end 34a in the direction of insertion into the cartridge holder 31. A memory chip 75 can be placed on the chip holder 76. The memory chip 75 is an example of a storage unit for storing information about the ink injected from the injection port 73 into the ink tank 33, and the chip holder 76 is an example of a component for holding the storage unit. The memory chip 75 held by the chip holder 76 can engage with a communication unit 77 provided to the cartridge holder 31 side of the printer 11 when the slider 34 is inserted into the cartridge holder 31 while on the top 39 of the ink tank 33. This engagement with the communication unit 77 brings the memory chip 75 placed on the chip holder 76 into contact with a terminal 78 provided to the communication unit 77, establishing an electrical connection. As a result, the ink-related information stored in the memory chip 75 is transmitted to the printer 11 side.

In the printer 11 according to this embodiment, the slider 34 and the connector 43 are positioned in the printer 11 by a pair of plate springs 79 attached to the cartridge holder 31 when the slider 34 is inserted into the cartridge holder 31 of the printer 11 while on the top 39 of the ink tank 33. More specifically, as illustrated in FIG. 2, sloping plate springs 79 are screwed in the vertical direction to the upper frame 35 and the lower frame 36, and the spacing therebetween tapers in the direction of insertion. The chip holder 76 provided to the slider 34 has a projection 80, and the plate spring 79 attached to the upper frame 35 touches this projection 80 in an energized state. On the other hand, the plate spring 79 attached to the lower frame 36 touches a projection sticking out of the connector 43 (not illustrated) in an energized state. As a result, the slider 34 (the chip holder 76) and the connector 43 are positioned in vertical direction Z by the pair of plate springs 79.

Furthermore, once the slider 34 is inserted while on the ink tank 33, both of the slider 34 and the second chamber 38 of the ink tank 33 are positioned in the cartridge holder 31. More specifically, as illustrated in FIG. 2, the slider 34 has a ridge 82 extending in the longitudinal direction on the top, and this ridge 82 slides in contact with a slot (not illustrated) located on the bottom of the upper frame 35 of the cartridge holder 31 and is inserted into this slot. Likewise, the ink tank 33 has a ridge (not illustrated) extending in the longitudinal direction on the bottom, and this ridge engages with a slot 84 provided on the top of the lower frame 36 of the cartridge holder 31. In this way, the slider 34 and the second chamber 38 are individually positioned in the transverse direction through engagement between their own ridge and the corresponding slot. As a result, the slider 34 (and the chip holder 76 attached to the slider 34) and the connector 43 provided to the second chamber 38 are individually positioned in the transverse direction.

The chip holder 76 and the cover 74 as components of the slider 34 of each ink cartridge 21 are attached to the slider 34 in a detachable manner. With these components attached, the slider 34 can slide with respect to the top 39 of the ink tank 33. In other words, the slider 34 can be inserted into and removed from the cartridge holder 31 with the ink tank 33 secured to the printer 11.

The configuration of the components related to the injection port 73 in each ink cartridge 21 is as follows. As illustrated in FIG. 4A, the ink tank 33 has a liquid receiving surface 116 as a liquid receiver at the front of the top 39, and this surface intersects with vertical direction Z. The liquid receiving surface 116 has a substantially rectangular shape in a plan view, and its width, i.e., the length in horizontal direction X, is slightly shorter than that of the ink tank 33.

The ink tank 33 also has a wall member 117 surrounding the liquid receiving surface 116 on the top 39, and the wall member 117 sticks upward across the liquid receiving surface 116 (i.e., projecting in the direction opposite to the gravity force). The front wall of the wall member 117 has a notch 118 substantially in the middle in horizontal direction X, i.e., a portion where the wall member 117 is lower than in other portions. In this embodiment, therefore, the notch 118 as a recess is formed in the wall member 117 as a position surrounding the injection port 73. A pair of ribs 119 extend backward from the back wall of the wall member 117 across this wall.

A capping unit 121 placed on the liquid receiving surface 116 has a substantially cylindrical cap 120, with which the injection port 73 can be closed (see FIG. 4B). There is also a substantially column-shaped knob 122 extending upward from the top of the cap 120. The knob 122 is held when the cap 120 is removed from the injection port 73 and when the injection port 73 is closed with the cap 120.

The capping unit 121 is secured to the liquid receiving surface 116 by an anchoring structure 123. In the situation illustrated in FIG. 4A, the anchoring structure 123 is in the back of the capping unit 121, compared to the cap 120 in the front. The anchoring structure 123 is fastened into a hole 124 in the liquid receiving surface 116 (see FIG. 5) and can rotate around the axis of the hole 124 and cannot be removed from the liquid receiving surface 116. As a result, the capping unit 121 can rotate around the anchoring structure 123 with respect to the liquid receiving surface 116 and is difficult to remove from the liquid receiving surface 116. However, it is possible to replace the capping unit 121, including the anchoring structure 123, with a new capping unit 121.

The capping unit 121 also has a connection 125, which links the cap 120 to the anchoring structure 123 and is bent more than once in a direction crossing vertical direction Z (three times in horizontal direction X in this embodiment) while on the liquid receiving surface 116. The connection section 125 has a rectangular cross-section when viewed in the direction of extension, and this rectangular cross-section is longer in the direction parallel to the liquid receiving surface 116 than in the direction crossing the liquid receiving surface 116 (vertical direction Z). This ensures a large area of contact with the liquid receiving surface 116 while the connection 125 is on the liquid receiving surface 116, allowing for stable placement on the liquid receiving surface 116.

These components of the capping unit 121, namely the cap 120, the connector 125, and the anchoring structure 123, are made of an elastomer (e.g., rubber or resin) or a similar material and can be elastically deformed. In the situation illustrated in FIG. 4A, therefore, the cap 120 fits into the injection port 73 while in an elastically deformed state, thereby closing the injection port 73 with no space between the cap 120 and the injection port 73.

As illustrated in FIG. 4B, the cap 120 removed from the injection port 73 can be placed on the back (bottom) 74a of the cover 74 in the open position. The area of the back 74a of the cover 74 is larger than the projected area of the cap 120 viewed in vertical direction Z, allowing for stable placement of the cap 120.

The back 74a of the cover 74 slopes downward toward the front, i.e., toward the area where the injection port 73 is located, while the cover 74 is in the open position (as illustrated in FIG. 4A). At the lateral ends of the back 74a of the cover 74 in the open position, side walls 91a and 92a stand upward. When the cap 120 is placed on the back 74a of the cover 74 in the open position with ink attached thereto, the side walls 91a and 92a also serve as a barrier that prevents the ink from leaking out of the cover 74.

In FIG. 4B, the cap 120 has been removed from the injection port 73 of the ink cartridge 21 and the cap 120 is on the back 74a of the cover 74. The user can inject ink into the ink tank 33 (the first ink compartment 151; see FIG. 8) via the injection port 73 created in the liquid receiving surface 116 while the injection port 73 is accessible as illustrated in FIG. 4B. The upper edge of the injection port 73, namely the rim 73a, is beveled to slope, helping the ink flowing into the injection port 73 during an ink injection operation.

The length of the connection 125 of the capping unit 121 is, as illustrated in FIG. 4B, long enough to allow the cap 120 to be placed on the back 74a of the cover 74 in the open position. In the situation illustrated in FIG. 4B, the connection 125 has been slightly stretched, and the cap 120 is on the back 74a of the cover 74 and touches a hook 110 formed on the cover 74.

As illustrated in FIG. 5, the hole 124, into which the anchoring structure 123 of the capping unit 121 is inserted and fastened, is created in the liquid receiving surface 116 near the back wall of the wall member 117 (the right side in FIG. 5) to intersect with the liquid receiving surface 116. The hole 124 is made in such a way that the center of the length of the hole 124 in horizontal direction X is substantially aligned with that of the injection port 73. The hole 124 is created in the liquid receiving surface 116 as with the injection port 73, but does not communicate with the first ink compartment 151.

The liquid receiving surface 116 slopes downward (in the direction of the gravity force) toward the injection port 73 in depth direction Y, as illustrated in FIG. 6. This means that the liquid receiving surface 116 is highest in the vicinity of the hole 124, the area furthest from the injection port 73. The anchoring structure 123 of the capping unit 121 fastened into the hole 124 is therefore higher than the area of the liquid receiving surface 116 around the injection port 73. This ensures that during the injection of ink into the injection port 73 or in a similar situation, the ink running on the liquid receiving surface 116 is unlikely to adhere. As illustrated in FIG. 7A, the liquid receiving surface 116 also slopes downward toward the injection port 73 in horizontal direction X. Furthermore, as illustrated in FIG. 7B, the liquid receiving surface 116 slopes downward toward the center in horizontal direction X near the hole 124, i.e., in the area furthest from the injection port 73.

The actions related to the injection of ink into the ink cartridge 21 are as follows. To inject ink into the ink tank 33, the user moves the cover 74 to the open position as in FIG. 4A, and places the cap 120 on the back 74a of the cover 74 as in FIG. 4B to make the injection port 73 accessible. The user can place the cap 120 on the back 74a of the cover 74 by removing the cap 120 from the injection port 73 and then rotating the capping unit 121 around the anchoring structure 123 with respect to the liquid receiving surface 116 by a certain angle (180° in this embodiment). In the situation illustrated in FIG. 4B, the back 74a of the cover 74 is higher than the liquid receiving surface 116 in vertical direction Z; thus, the connection 125 is slightly stretched while the cap 120 is on the back 74a of the cover 74. The restoring force produced by the elastic deformation (elongation) of the connection 125 pulls the cap 120 forward from the cover 74. In this embodiment, however, the hook 110 formed on the cover 74 is in contact with the cap 120, effectively preventing the cap 120 from falling down from the cover 74 and similar accidents. Furthermore, the back 74a of the cover 74 in the open position is lowest near the hook 110, and this has some advantages. For example, even if the cap 120 is placed on the back 74a of the cover 74 with ink attached thereto, therefore, the ink is unlikely to spread over the entire cover 74 (in particular, the rear area).

As illustrated in FIGS. 9 and 10, the ink tank 33 is loaded with ink by using an ink source 126 prepared by layering two pieces of film or a similar material, joining the edge 128 of the two layers, and creating an opening 127. In this way, ink is used with a printer (droplet discharge apparatus) 11 having refillable ink cartridges 21 (ink tanks 33) in this embodiment. As mentioned above, the use of an ink according to an aspect of the invention with a printer (droplet discharge apparatus) of this type effectively prevents some problems such as the formation of insoluble material in the ink and related issues (e.g., a reduced stability of droplets discharged by an ink jet process).

To inject the ink, the user positions the ink source 126 with respect to the ink tank 33 by holding the ink source 126 to fit the edge 128 into the notch 118 of the wall member 117 of the ink tank 33 near the opening 127. Then, as illustrated in FIG. 10, the user lifts the ink source 126 with the ink source 126 in contact with the ink tank 33 to make the opening 127 of the ink source 126 face down. As a result, the ink in the ink source 126 flows down into the first ink compartment 151 through the injection port 73 of the ink tank 33.

If the user lifts the ink source 126 too fast, the ink flowing through the opening 127 of the ink source 126 may miss the injection port 73 and reach the area of the liquid receiving surface 116 outside the injection port 73. In such a case, however, the wall member 117 surrounding the liquid receiving surface 116 dams up the ink poured on the liquid receiving surface 116, preventing the ink from flowing out of the liquid running surface 116. Since the liquid receiving surface 116 slopes downward toward the injection port 73 in horizontal direction X and depth direction Y, the ink adhering to the liquid receiving surface 116 is guided to the injection port 73 along the slopes. After injecting the ink, the user returns the cap 120 on the back 74a of the cover 74 to close the injection port 73 of the ink tank 33 as in FIG. 4A, and then moves the cover 74 to the closed position as in FIG. 2 to finish the injection operation.

As illustrated in FIG. 11, when two or more ink cartridges 21 are arranged in parallel, the length L6 from the anchoring structure 123 of the capping unit 121 (the hole 124) for a first ink cartridge 21 (e.g., the first from the left) to the injection port 73 of the same cartridge is shorter than the length L7 from the anchoring structure 123 on the first ink cartridge 21 to the injection port 73 of the second ink cartridge 21 next to the first ink cartridge 21. This ensures that the cap 120 of the capping unit 121 for the first ink tank 33 from the left does not close the injection port 73 of the next ink tank 33 even when rotated around the anchoring structure 123 to approach this injection port 73 as illustrated in FIG. 11 (dot-dot-dash lines in FIG. 11). The lengths L6 and L7 are, as illustrated in FIG. 11, the center-to-center distance between one anchoring structure 123 (hole 124) and the nearest injection port 73 and between the anchoring structure 123 (hole 124) and the next injection port 73, respectively, in a plan view.

The following describes the actions that occur in the ink tank 33 while ink is injected through the injection port 73 with reference to FIG. 8. As ink is injected through the injection port 73, the fluid level in the first ink compartment 151 rises, and the ink flows into the second ink compartment 152 through a wall opening 155. A recess 154 formed in the first ink compartment 151 is misaligned with the injection port 73 in depth direction Y. This ensures that even if insoluble material accumulates in the recess 154, the insoluble material is unlikely to disperse up into the ink. The first ink compartment 151 and the second ink compartment 152 communicate with each other via a wall vent 156; therefore, the first ink compartment 151 and the second ink compartment 152 have a substantially equal internal pressure. As a result, the level of the ink in vertical direction Z rises at a substantially equal rate in the first ink compartment 151 and the second ink compartment 152.

Each of a third slanted rib 158c and a fourth slanted rib 158d has rib openings 161 at both ends. The ink flows through these rib openings 161, and the level of the ink remains substantially equal on both sides of the third slanted rib 158c and the fourth slanted rib 158d. The ink then goes through the space between a first slanted rib 158a, a second slanted rib 158b, and a piece of film 133, and the level of the ink rises beyond the first slanted rib 158a and the second slanted rib 158b. As the level of the ink further rises, the ink spreads and climbs the sloping bottom 152a, and the ink flows through the rib opening 161 of fourth to ninth transverse ribs 157d to 157i, further increasing the level. Each of the transverse ribs 157a to 157i has a rib vent 160. In the second ink compartment 152, therefore, the spaces divided by the transverse ribs 157a to 157i have a substantially equal pressure. As a result, the level of the ink in vertical direction Z rises at a substantially equal rate in all sections in the second ink compartment 152.

In the ink tank 33, which has the injection port 73, insoluble material may form. Contaminants such as dust may intrude through the injection port 73 and settle, and even the ink itself may form insoluble substance due to drying at the gas-liquid interface or for other reasons. In the first ink compartment 151, insoluble material accumulates on the surface 153 facing the injection port 73 and in the recess 154. Since the wall opening 155 is located away from the recess 154, the insoluble material is less likely to flow into the second ink compartment 152 than the ink. In particular, large-size or heavy fractions of contaminants that intrude through the injection port 73 are likely to stay in the first ink compartment 151.

As for the second ink compartment 152, insoluble material accumulates on the slanted ribs 158a to 158d in the front and on the bottom 152a in the back as time goes by. The slanted ribs 158a to 158d and the bottom 152a, on which insoluble material settles, slope across depth direction Y. This ensures that the sediments of insoluble material move in one direction (downward) as the level of the ink moves while the ink is sent out through an exit (not illustrated).

Furthermore, injecting ink through the injection port 73 may cause bubbles to intrude with the injected ink. If the bubbles enter the second ink compartment 152 or dissolved gas turns into bubbles in the second ink compartment 152, the bubbles rise to the slanted ribs 158a to 158d. In this embodiment, however, the slanted ribs 158a to 158d slope across depth direction Y, and the bubbles move along the slope of the slanted ribs 158a to 158d to the surface of the ink. The ink in the second ink compartment 152 flows into a channel (not illustrated), goes through an outward passage 138, and is sent out through the exit.

Method for manufacturing a dyed article

The following describes a method for manufacturing a dyed article by using an ink according to an embodiment of the invention. The method for manufacturing a dyed article according to this embodiment includes two operations: applying the ink according to an embodiment of the invention to a transfer medium by an ink jet process (ink application); and transferring the disperse dye to a piece of fabric by heating the transfer medium, i.e., a recording medium carrying the ink according to an embodiment of the invention applied thereto, with the transfer medium facing the piece of fabric (ink transfer).

Ink Application

First, the ink according to an embodiment of the invention is applied to the transfer medium by an ink jet process. An example of a device that can be used to apply the ink is a liquid discharge apparatus (printer) of the aforementioned type. The ink is applied to draw a pattern corresponding to the intended pattern on the finished print (a mirror pattern).

Inks according to embodiments of the invention have excellent storage stability, can be used for long periods of time while the formation of insoluble material therein is effectively prevented, and, therefore, can be discharged by an ink jet process in a stable manner. The use of such an ink effectively prevents some problems such as unwanted changes in the amount of discharge of ink over time, thereby ensuring that dyed articles can be produced in a consistent manner, i.e., with greatly reduced unwanted variations in quality, for long periods of time.

An example of a suitable transfer medium is one having no adhesive layer on the side facing the piece of fabric. With no adhesive layer, the transfer medium is unlikely to affect the texture of the dyed fabric and is reliable in dyeing the piece of fabric in the desired pattern. Examples of recording media that can be used include plain paper and recording media having an ink receiving layer (referred to as ink jet paper, coated paper, or the like). In particular, paper coated with silica or a similar particulate inorganic material to have an ink receiving layer is suitable. The use of such a kind of paper prevents bleeding and other defects of the intermediate record obtained while the ink applied to the recording medium is dried, and also helps the disperse dye sublime while the transfer medium is heated. It is possible that two or more inks are used to prepare (applied to) the transfer medium. This offers some advantages such as an extended color gamut.

Ink Transfer

The transfer medium, prepared by applying the ink according to an embodiment of the invention to a recording medium, is then heated with the transfer medium facing the piece of fabric. The disperse dye is transferred from the transfer medium to the piece of fabric, and the intended dyed article is obtained. The heating temperature is preferably in the range of 140° C. to 250° C., both inclusive, more preferably 180° C. to 200° C., both inclusive. This ensures that the disperse dye sublimes and is transferred in an efficient and consistent manner, thereby greatly improving the productivity of dyed articles. Furthermore, avoiding heating the transfer medium more than necessary contributes to energy conservation, for example.

Depending on the heating temperature, the heating time is preferably in the range of 20 seconds to 90 seconds, both inclusive, more preferably 30 seconds to 60 seconds, both inclusive. This also ensures that the disperse dye sublimes and is transferred in an efficient and consistent manner and greatly improves the productivity of dyed articles. Furthermore, reduced energy consumption in the entire process of manufacturing dyed articles contributes to energy conservation.

As mentioned above, the transfer medium faces the piece of fabric (substrate) while heated. Preferably, the transfer medium is in close contact with the piece of fabric while heated. This reduces the energy requirement for ink transfer, thereby leading to greatly improved productivity of dyed articles. The reliability of the dyed articles produced is also greatly improved because the manufacturing process becomes more reliable in dyeing the substrate in the desired pattern.

Examples of fabrics that can be used include ones made from polyester, nylon, triacetate, diacetate, polyamide, or similar fibers. Fabrics made from a blend of two or more of such fibers can also be used. Furthermore, fabrics made from a blend of such a fiber with a regenerated fiber (e.g., rayon) or a natural fiber (e.g., cotton, silk, or wool) can also be used. The fabric can be sheet-shaped one (e.g., a roll of cloth) or have a three-dimensional shape (e.g., T-shirts).

Dyed Article

A dyed article according to an embodiment of the invention is produced using an ink according to an embodiment of the invention such as the one described above. This dyed article exhibits excellent color saturation. The dyed article according to this embodiment of the invention has a wide variety of applications including clothes such as T-shirts and sweatshirts, flags and banners, and so forth.

It should be noted that the above preferred embodiments are for illustration purposes only and should not be construed as limiting any aspect of the invention. The dyed article according to a different embodiment of the invention may be produced by a different method, although made using an ink according to an embodiment of the invention. For example, the dyed article according to another embodiment of the invention may be produced by a method additionally including processing the raw materials, the workpiece, and/or the dyed article.

Although in the above embodiment the mechanism for droplet discharge (the mode of the ink jet process) is piezoelectric force, the ink may be discharged by a different mechanism such as bubbles formed by heating the ink, for example. Furthermore, although in the above embodiment the ink is used with a droplet discharge apparatus (printer) having refillable ink cartridges, the ink according to another embodiment of the invention may be used with one having disposable cartridges, for example.

EXAMPLES

1. Preparation of Inks (Sublimation Transfer Inks)

Example 1

Ink was prepared in the following way. A disperse dye (C.I. Disperse Red 60), a resin dispersant (a styrene-acrylic copolymer), an ingredient (D) represented by formula (2) (R and m in formula (2), oleyl and 26; HLB, 16.2), and ion-exchanged water were mixed. In a sand mill, the mixture was cooled and dispersed with 0.2-mm glass beads for about 15 hours. The dispersion was diluted with ion-exchanged water, and the diluted dispersion was filtered through GC-50 glass fiber filter (Toyo Roshi Kaisha, Ltd.; pore size, 0.5 μm). In this way, an aqueous dispersion containing no coarse particles was obtained. This aqueous dispersion was diluted with ion-exchanged water to yield ink (a sublimation transfer ink). The following is the composition of the obtained ink.

| | |
|---|---|
| C.I. Disperse Red 60 | 5.0% by weight |
| Styrene-acrylic copolymer | 2.5% by weight |
| Ingredient (D) | 0.3% by weight |
| Triethylene glycol monomethyl ether | 3.0% by weight |
| Glycerol | 15.0% by weight |
| Triethanolamine | 0.5% by weight |
| Ion-exchanged water | 73.7% by weight |
| Total | 100% by weight |

Examples 2 to 9

Ink was obtained in the same way as Example 1 except that the ink composition was changed in accordance with Table 1.

Comparative Examples 1 to 10

Ink was obtained in the same way as Example 1 except that the ink composition was changed in accordance with Table 1.

Table 1 summarizes the composition of the inks of Examples and Comparative Examples. The meanings of the abbreviations used in Table 1 are as follows: DR60, C.I. Disperse Red 60; DB359, C.I. Disperse Blue 359; SV13, C.I. Solvent Violet 13; StAc, the styrene-acrylic copolymer (resin dispersant); SDDED, sodium dodecyl diphenyl ether disulfonate, an anionic compound similar to formula (1).

The values in "Weight-average molecular weight" column are weight-average molecular weights measured using HLC-8320GPC (Ikeda Scientific Co., Ltd.). For all of the inks according to Examples, the surface tension at 25° C. measured using CBVP-A3 surface tensiometer (Kyowa Interface Science Co., Ltd.) in accordance with JIS K3362 was in the range of 25 mN/m to 40 mN/m, both inclusive, and the viscosity at 25° C. measured using a vibrational viscometer in accordance with JIS Z8809 was in the range of 2 mPa·s to 20 mPa·s, both inclusive.

TABLE 1

| | Disperse dye (ingredient (B)) | | Resin dispersant (ingredient (C)) | | Ingredient (D) | | | | | |
|---|---|---|---|---|---|---|---|---|---|---|
| | Dye | Content [% by weight] | Resin | Content [% by weight] | Formula | R | m | $M^+$ | HLB | Content [% by weight] |
| Example 1 | DR60 | 5 | StAc | 2.5 | (2) | Oleyl | 26 | — | 16.2 | 0.3 |
| Example 2 | DR60 | 5 | StAc | 2.5 | (2) | 2-Ethylhexyl | 20 | — | 17.4 | 0.5 |
| Example 3 | DB359 | 5 | StAc | 2 | (2) | Oleyl | 26 | — | 16.2 | 0.3 |
| Example 4 | DB359 | 5 | StAc | 2 | (2) | Oleyl | 26 | — | 16.2 | 1.0 |
| Example 5 | DB359 | 5 | StAc | 2 | (2) | 2-Ethylhexyl | 20 | — | 17.4 | 0.5 |
| Example 6 | DB359 | 4 | StAc | 2.5 | (1) | Oleyl | 23 | $Na^+$ | — | 0.1 |
| Example 7 | DB359 | 4 | StAc | 2.5 | (1) | Oleyl | 23 | $Na^+$ | — | 0.5 |
| Example 8 | SV13 | 4 | StAc | 2 | (1) | Oleyl | 23 | $Na^+$ | — | 1.0 |
| Example 9 | SV13 | 4 | StAc | 2 | (1) | Oleyl | 23 | $Na^+$ | — | 0.3 |
| Comp. Ex. 1 | DR60 | 5 | StAc | 2.5 | (2) | Oleyl | 26 | — | 16.2 | 0.1 |
| Comp. Ex. 2 | DR60 | 5 | StAc | 2.5 | (2) | Oleyl | 26 | — | 16.2 | 1.5 |
| Comp. Ex. 3 | DR60 | 5 | StAc | 2.5 | (2) | 2-Ethylhexyl | 20 | — | 17.4 | 0.1 |
| Comp. Ex. 4 | DR60 | 5 | StAc | 2.5 | (2) | 2-Ethylhexyl | 20 | — | 17.4 | 1.5 |
| Comp. Ex. 5 | DR60 | 5 | StAc | 2.5 | (2) | 2-Ethylhexyl | 6 | — | 13.4 | 0.5 |
| Comp. Ex. 6 | DB359 | 4 | StAc | 2.5 | (1) | Oleyl | 23 | $Na^+$ | — | 0.05 |
| Comp. Ex. 7 | DB359 | 4 | StAc | 2.5 | (1) | Oleyl | 23 | $Na^+$ | — | 2.0 |
| Comp. Ex. 8 | DB359 | 4 | StAc | 2.5 | — | — | — | — | — | — |
| Comp. Ex. 9 | DB359 | 4 | StAc | 2.5 | — | — | — | — | — | — |
| Comp. Ex. 10 | DB359 | 4 | StAc | 2.5 | — | — | — | — | — | — |

| | Water (ingredient (A)) Content [% by weight] | Others | | | | Ratio of (D) content to (C) content [%] |
|---|---|---|---|---|---|---|
| | | SDDED Content [% by weight] | MTG Content [% by weight] | GL Content [% by weight] | TEA Content [% by weight] | |
| Example 1 | 76.7 | — | 3.0 | 15.0 | 0.5 | 12 |
| Example 2 | 76.5 | — | 3.0 | 15.0 | 0.5 | 20 |
| Example 3 | 77.2 | — | 3.0 | 15.0 | 0.5 | 15 |
| Example 4 | 76.5 | — | 3.0 | 15.0 | 0.5 | 50 |
| Example 5 | 77.0 | — | 3.0 | 15.0 | 0.5 | 25 |
| Example 6 | 77.9 | — | 3.0 | 15.0 | 0.5 | 4 |
| Example 7 | 77.5 | — | 3.0 | 15.0 | 0.5 | 20 |
| Example 8 | 77.5 | — | 3.0 | 15.0 | 0.5 | 50 |
| Example 9 | 78.2 | — | 3.0 | 15.0 | 0.5 | 15 |
| Comp. Ex. 1 | 76.9 | — | 3.0 | 15.0 | 0.5 | 4 |
| Comp. Ex. 2 | 75.5 | — | 3.0 | 15.0 | 0.5 | 60 |
| Comp. Ex. 3 | 76.9 | — | 3.0 | 15.0 | 0.5 | 4 |
| Comp. Ex. 4 | 75.5 | — | 3.0 | 15.0 | 0.5 | 60 |
| Comp. Ex. 5 | 76.5 | — | 3.0 | 15.0 | 0.5 | 20 |
| Comp. Ex. 6 | 77.95 | — | 3.0 | 15.0 | 0.5 | 2 |
| Comp. Ex. 7 | 76.0 | — | 3.0 | 15.0 | 0.5 | 80 |
| Comp. Ex. 8 | 77.5 | 0.5 | 3.0 | 15.0 | 0.5 | — |
| Comp. Ex. 9 | 77.0 | 1.0 | 3.0 | 15.0 | 0.5 | — |
| Comp. Ex. 10 | 78.0 | — | 3.0 | 15.0 | 0.5 | 0 |

2. Storage Stability of the Inks

2.1 Formation of Insoluble Material at the Gas-Liquid Interface

The inks of Examples and Comparative Examples, 30 mL each, were put into glass bottles and were left to stand at 40° C. for 7 days with the bottles open. The inks were then visually inspected for the formation of insoluble material at the gas-liquid interface and evaluated in accordance with the following criteria.
A: No insoluble material formed.
B: A slight amount of insoluble material formed.
C: A noticeable amount of insoluble material formed.

2.2 Change in Viscosity

The inks of Examples and Comparative Examples were tightly sealed in glass bottles and left to stand at 70° C. for 7 days. The viscosity of each ink was then measured using a vibrational viscometer in accordance with JIS Z8809 and evaluated in accordance with the following criteria:
A: The change (percent change) in viscosity during the heating period was less than 5%;
B: The change (percent change) in viscosity during the heating period was in the range of 5% to less than 10%;
C: The change (percent change) in viscosity during the heating period was 10% or more.

2.3 Change in the Particle Diameter of the Dispersoid

The inks of Examples and Comparative Examples were tightly sealed in glass bottles and left to stand at 70° C. for 7 days. The particle diameter of the dispersoid in each ink was then measured using Microtrac UPA (Nikkiso Co., Ltd.), and the change in the particle diameter of the dispersoid during the heating period was evaluated according to the following criteria:

A: The change (percent change) in the average particle diameter of the dispersoid during the heating period was less than 5%;

B: The change (percent change) in the average particle diameter of the dispersoid during the heating period was in the range of 5% to less than 10%;

C: The change (percent change) in the average particle diameter of the dispersoid during the heating period was 10% or more.

3. Production of Dyed Articles

The inks of Examples and Comparative Examples were used to produce dyed articles in the following way. First, the ink was put into a printer (droplet discharge apparatus) of the type illustrated in FIGS. 1 to 11.

The ink was then applied to a sheet of Transjet Classic 831 sublimation transfer paper (Cham Paper Group), a transfer medium having no adhesive layer, to draw a predetermined pattern (ink application). The formed pattern was transferred to a piece of polyester fiber cloth (a substrate) by heating the transfer medium at 180° C. for 60 seconds with the ink receiving layer of the transfer medium in contact with the substrate (ink transfer). In this way, a dyed article was obtained.

4. Evaluation of the OD (Optical Density) of the Dyed Articles

The dyed articles produced in Section 3 were observed using SpectroScan (GretagMacbeth), and the OD of the dyed area was evaluated in accordance with the following criteria:

A: The OD was 1.4 or more;
B: The OD was in the range of 1.35 to less than 1.4;
C: The OD was less than 1.35.

Table 2 summarizes the test results for the individual Examples and Comparative Examples.

TABLE 2

| | Tests of the ink Storage stability of the ink | | | |
| --- | --- | --- | --- | --- |
| | Formation of insoluble material | Change in viscosity | Change in particle diameter | Test of the dyed article OD |
| Example 1 | A | A | A | A |
| Example 2 | A | A | A | A |
| Example 3 | B | A | A | A |
| Example 4 | B | A | B | B |
| Example 5 | B | A | A | A |
| Example 6 | B | A | A | A |
| Example 7 | A | A | A | A |
| Example 8 | A | A | A | B |
| Example 9 | A | A | A | A |
| Comp. Ex. 1 | C | A | A | A |
| Comp. Ex. 2 | A | A | A | C |
| Comp. Ex. 3 | C | A | A | A |
| Comp. Ex. 4 | A | A | A | C |
| Comp. Ex. 5 | A | C | C | B |
| Comp. Ex. 6 | C | A | A | A |

TABLE 2-continued

| | Tests of the ink Storage stability of the ink | | | |
| --- | --- | --- | --- | --- |
| | Formation of insoluble material | Change in viscosity | Change in particle diameter | Test of the dyed article OD |
| Comp. Ex. 7 | A | A | A | C |
| Comp. Ex. 8 | C | A | A | A |
| Comp. Ex. 9 | A | B | B | C |
| Comp. Ex. 10 | C | B | B | B |

As is clear from Table 2, the inks prepared as examples of an aspect of the invention imparted excellent color saturation to the articles dyed therewith. Furthermore, these inks formed no or little insoluble material during storage for a long period of time, demonstrating excellent storage stability. The test results for Comparative Examples were unsatisfactory.

The entire disclosure of Japanese Patent Application No. 2012-246041, filed Nov. 8, 2012 is expressly incorporated by reference herein.

What is claimed is:

1. A sublimation transfer ink, which is applied to a transfer medium by a liquid discharge apparatus, heated with said transfer medium facing a piece of fabric and transferred to said fabric, comprising:
    (A) water;
    (B) a disperse dye;
    (C) a resin dispersant; and
    (D) a compound represented by formula (1), wherein
    a ratio of a mass of the ingredient (D) to a mass of the ingredient (C) is in a range of 4% to 50%, both inclusive:

$$RO(CH_2CH_2O)_mSO_3^-M^+ \quad (1)$$

wherein the group R is an oleyl or lauryl group, m is an integer of 2 to 50, and $M^+$ is an alkali metal or ammonium ion,
    wherein the ingredient (C) includes a styrene-acrylic copolymer.

2. The sublimation transfer ink according to claim 1, wherein the ratio of the mass of the ingredient (D) to the mass of the ingredient (C) is 10% to 30%, both inclusive.

3. The sublimation transfer ink according to claim 1, wherein the ingredient (D) constitutes 0.1% by mass to 1.0% by mass, both inclusive, of the ink.

4. The sublimation transfer ink according to claim 1, wherein a ratio of the mass of the ingredient (C) to a mass of the ingredient (B) is in a range of 30% to 70%, both inclusive.

5. The sublimation transfer ink according to claim 1, wherein the ingredient (B) constitutes 1.0% by mass to 10% by mass, both inclusive, of the ink.

6. The sublimation transfer ink according to claim 1, wherein the ion $M^+$ in formula (1) is an ammonium ion derived from ammonia, methylamine, ethylamine, monoethanolamine, diethanolamine, or triethanolamine.

7. The sublimation transfer ink according to claim 1, wherein the ink is used with a droplet discharge apparatus having a refillable ink cartridge.

* * * * *